US 8,189,081 B2
May 29, 2012

(12) United States Patent
Totsuka

(10) Patent No.: US 8,189,081 B2
(45) Date of Patent: May 29, 2012

(54) SOLID-STATE IMAGING APPARATUS, DRIVING METHOD THEREOF, CAMERA, AND COPIER

(75) Inventor: Hirofumi Totsuka, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 902 days.

(21) Appl. No.: 12/248,348

(22) Filed: Oct. 9, 2008

(65) Prior Publication Data

US 2009/0115876 A1    May 7, 2009

(30) Foreign Application Priority Data

Nov. 1, 2007    (JP) ................................. 2007-285280

(51) Int. Cl.
*H04N 5/335* (2006.01)
(52) U.S. Cl. ....................................................... 348/294
(58) Field of Classification Search .................. 348/294; 250/208
See application file for complete search history.

(56) References Cited

U.S. PATENT DOCUMENTS

| | | | |
|---|---|---|---|
| 5,453,611 A | 9/1995 | Oozu et al. | 250/208 |
| 5,801,373 A | 9/1998 | Oozu et al. | 250/208 |
| 6,750,437 B2 * | 6/2004 | Yamashita et al. | 250/208.1 |
| 7,521,659 B2 * | 4/2009 | Asaba et al. | 250/208.1 |
| 2006/0169871 A1 | 8/2006 | Kochi | 250/208 |

FOREIGN PATENT DOCUMENTS

| | | |
|---|---|---|
| JP | H06-204445 A | 7/1994 |
| JP | 2003-051989 A | 2/2003 |
| JP | 2003-087503 A | 3/2003 |
| JP | 2006-211363 A | 8/2006 |

* cited by examiner

*Primary Examiner* — Ricky Mack
*Assistant Examiner* — Vipin Patel
(74) *Attorney, Agent, or Firm* — Fitzpatrick, Cella, Harper & Scinto

(57) ABSTRACT

A solid-state imaging apparatus includes a plurality of unit cells, each including a plurality of pixels having mutually different color components and a first selecting unit outputting one of the signals from the plurality of pixels selectively. The unit cells are classified into groups. The solid-state imaging apparatus further includes holding units, each provided to each of the unit cells and holding the signal output from the first selecting unit, a plurality of common output lines for outputting signals of mutually different color components, and second selecting units, each selecting one of the plurality of common output lines to output the signals held in the holding unit to the selected common output line. The first selecting units severally output a signal of a different color component from each of the unit cell groups.

12 Claims, 15 Drawing Sheets

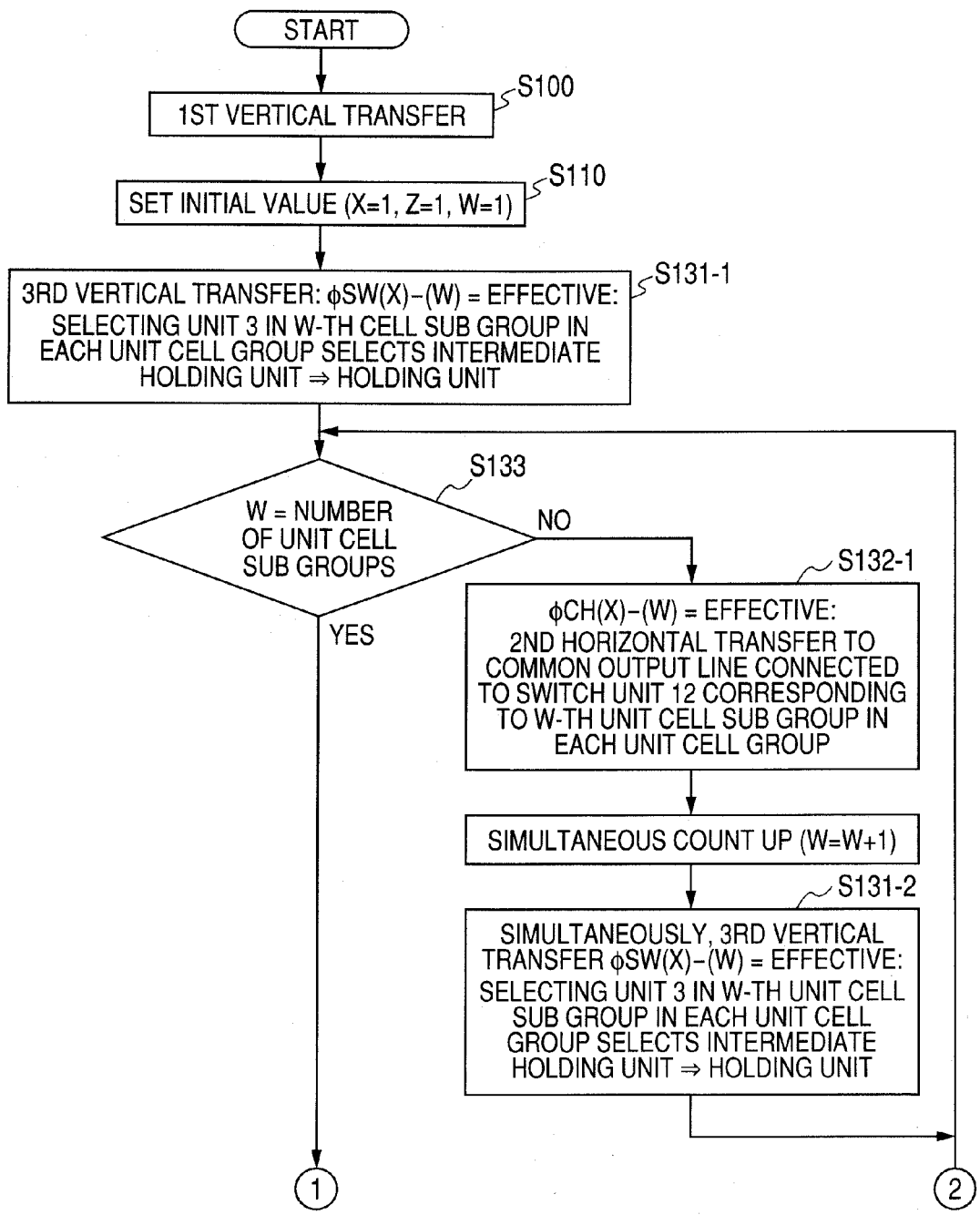

SOLID-STATE IMAGING APPARATUS, DRIVING METHOD THEREOF, CAMERA, AND COPIER

BACKGROUND OF THE INVENTION

1. Field of the Invention

The present invention relates to a solid-state imaging apparatus to be used for an image reading apparatus, such as a copier and a scanner, a driving method of the solid-state imaging apparatus, and a camera and copier, both using the solid-state imaging apparatus.

2. Description of the Related Art

For example, Japanese Patent Application Laid-Open No. 2006-211363 (first Patent Document) discloses a solid-state imaging apparatus to be used for an image reading apparatus, such as a copier and a scanner, especially for reading a color image. As illustrated in FIG. 1 of the first Patent Document, the solid-state imaging apparatus is equipped with photodiodes to read a plurality of different color components and has accumulation capacities corresponding to the respective photodiodes.

Japanese Patent Application Laid-Open No. H06-204445 (second Patent Document) illustrates a solid-state imaging apparatus including one common output line. But, if signals are output from respective color components, for example, FIG. 12 of the second Patent Document illustrates another configuration of the solid-state imaging apparatus.

FIG. 4 of Japanese Patent Application Laid-Open No. 2003-087503 (third Patent Document) especially illustrates a color copier of connecting amplifier circuits having amplifying gains peculiar to respective colors to the subsequent stage of a solid-state imaging apparatus.

Accordingly, in order to deal with such a configuration, a configuration of outputting signals through a plurality of common output lines, and of outputting only one color component from each of the common output lines is required. Because the configurations of the second and third Patent Documents perform parallel signal outputting from the plurality of common output lines, the configurations enable their reading time to be faster than that of the first Patent Document by the number of the parallel output lines.

When signals are read from the accumulation capacities of these solid-state imaging apparatus, the signals are read through signal transfer switches in accordance with the gains according to the capacity dividing ratios of the whole capacity of the common output lines and the accumulation capacities. If the capacity value of a common output line is denoted by CH, and the accumulation capacity value thereof is denoted by CT, then the reading gain Gc thereof is expressed by a formula Gc=CT/(CT+CH). Because the reading gain Gc always takes a value less than one, it is also performed to output a signal by multiplying the signal by a gain of one or more in the output circuit at the subsequent state in order to compensate the lost gain.

In addition to the above-mentioned configurations, the configuration disclosed in Japanese Patent Application Laid-Open No. 2003-051989 (fourth Patent Document) is sometimes adopted when the improvement of the performance of S/N ratio is required. The configuration illustrated in FIG. 8 of the fourth Patent Document enables the removal of the noise components that are generated in photodiodes and charge-voltage converting units by providing two accumulation capacity systems for each pixel. Alternatively, the configuration illustrated in FIG. 4 of the fourth Patent Document is equipped with an amplifier circuit in the vertical transfer unit of each pixel. By adopting this configuration, the amplification is performed in the vertical transfer unit, which performs a low speed operation, and consequently noise reduction can be realized in comparison with the case where the amplification is performed in an output circuit, which performs a high speed operation. Furthermore, by adopting the configuration illustrated in FIG. 1 of the fourth Patent Document, the amplification is performed in the low speed operation circuit, removing the noise components generated in the photodiodes and the charge-voltage converting units. Consequently, further noise reduction can be realized.

In the cases of these solid-state imaging apparatus mentioned above, capacity dividing reading is performed from the accumulation capacities to the common output lines, and consequently signals are always read by the gain one or less. Furthermore, for example, in the case of a solid-state imaging apparatus reading an A-4 size original in the lateral direction, which is used in a copier and the like, at 600 dots per inch (DPI), a line sensor is led to include about 7500 pixels arranged at 10 µm pitches. In this case, the common output line has a length of about 7.5 cm, and signal transfer switches of about 7500 pixels at a maximum are connected to the common output line. Consequently, the capacity value CH of the common output line becomes a large value. Accordingly, it is necessary to set the accumulation capacity value CT to a large value or to set the output circuit at the subsequent stage to have a high gain in order to obtain the sufficient reading gain Gc. However, if the latter method is chiefly adopted, the high speed operation circuit is designed to have a high gain, which results in the deterioration of the S/N ratio of the circuit. Accordingly, the accumulation capacity value CT is frequently set to a large value generally.

Although the necessary accumulation capacity value CT depends on a semiconductor process and a circuit size, for example, if it is supposed that a capacity of 15 pF is attached to the capacity value CH of the common output line, then the accumulation capacity value CT is needed to be 0.3 pF when the reading gain Gc is $\frac{1}{5}$, and the accumulation capacity value CT is needed to be 0.5 pF when the reading gain Gc is $\frac{1}{3}$. For example, if the capacities are formed of metal-oxide-semiconductor (MOS) capacities, then the lengths of the accumulation capacities arranged at 10 µm pitches become 241.3 µm and 144.8 µm in the cases of the reading gains Gc of $\frac{1}{5}$ and $\frac{1}{3}$, respectively, when the thicknesses of oxide films are 1500 nm. Incidentally, separation spaces between capacitative elements are supposed to be 1 µm.

Attempts of reducing a chip size have been performed in the past in order to reduce manufacturing costs by increasing the number of chips capable of being taken out from a silicon wafer. As the technique of reducing a chip size, the method of realizing the reduction by means of a device of circuits of sharing the circuit elements having larger occupation areas with a plurality of constituent elements exists besides the method of realizing the reduction by the miniaturization of the semiconductor process. In particular, in the above-mentioned solid-state imaging apparatus, the sizes of the accumulation capacities are generally larger among that of each of the constituent elements, it is effective, for example, to reduce the total number of the accumulation capacities by sharing the accumulation capacities with a plurality of pixels, and to reduce the occupation areas of the accumulation capacities for reducing the chip size.

For example, if the accumulation capacities of the configuration of the second Patent Document are shared by the method mentioned above, for example, it is conceivable that the pixels of different color components in a same column share an accumulation capacity. However, in this case, the number of pixels that can read by one time of scanning is:

(total number of pixels)/(number of pixels sharing one accumulation capacity). Consequently, the method mentioned above has a problem that a plurality of times of scanning is needed for reading the signals of the total pixels, and that the total reading time of the total pixels becomes longer than that of the conventional configuration by about (number of pixels sharing one accumulation capacity) times.

SUMMARY OF THE INVENTION

It is an object of the present invention to provide a solid-state imaging apparatus having a smaller area without extending its reading time as short as possible in comparison with those of the conventional solid-state imaging apparatus.

According to a first aspect of the present invention, in order to solve the above described problem, a solid-state imaging apparatus comprises; a plurality of unit cells each including a plurality of pixels having different color components and a first selecting unit for selecting and outputting signals from the plurality of pixels, wherein the plurality of unit cells are classified into a plurality of unit cell groups, a holding unit being provided correspondingly to each unit cell, and holding a signal outputted from the first selecting unit, a plurality of common output lines to which the signals of different color components are outputted, and a second selecting unit for selecting the plurality of common output lines and for outputting the signal held by the holding unit to the common output line selected, wherein the first selecting unit outputs the signal of the different color components one group by one group of the unit cells.

According to an another aspect of the present invention, a driving method of a solid-state imaging apparatus comprises; a plurality of unit cells each including a plurality of pixels having different color components, a first holding unit for holding a signal outputted from the plurality of pixels and a first selecting unit for selecting and outputting the signals held by the first holding unit, wherein the plurality of unit cells are classified into a plurality of unit cell groups, a second holding unit being provided correspondingly to each unit cell, and holding a signal outputted from the first selecting unit, a plurality of common output lines to which the signals of different color components are outputted, and a second selecting unit for selecting the plurality of common output lines and for outputting the signal held by the second holding unit to the common output line selected, wherein the signals selected by the first and second selecting units are in the different color components one group by one group of the unit cells, and wherein the method comprises;
(1) a first vertical transferring step for transferring a signal accumulated in the pixel to the first holding unit; and
(2) a processing step of each of the unit cell groups conducted sequentially one color by one color, wherein the processing step (2) comprises:
(a) a second vertical transfer step for selecting, by the first selecting unit, the first holding unit holding the signals of the different color components one group by one group of the unit cells, and for transferring the held signal to the second holding unit; and
(b) a first horizontal transfer step for connecting, by the second selecting unit, the common output line corresponding to the signal of the color component held by the second holding unit connected to the second selecting unit with the second holding unit connected to the second selecting unit, and for outputting the signals held by the second holding units in unit cell groups sequentially one unit cell by one unit cell to the common output lines connected by the second selecting unit.

According to a further another aspect of the present invention, a driving method of a solid-state imaging apparatus comprises; a plurality of unit cells each including a plurality of pixels having different color components, a first holding unit for holding a signal outputted from the plurality of pixels and a first selecting unit for selecting and outputting the signals held by the first holding unit, wherein the plurality of unit cells are classified into a plurality of unit cell groups, and the plurality of unit cells within one unit cell group are classified into a plurality of unit cell sub-groups, a second holding unit being provided correspondingly to each unit cell, and holding a signal outputted from the first selecting unit, a plurality of common output lines to which the signals of different color components are outputted, and a second selecting unit for selecting the plurality of common output lines and for outputting the signal held by the second holding unit to the common output line selected, wherein the signals selected by the first and second selecting units are in the different color components one group by one group of the unit cells, and wherein the method comprises:
(1) a first vertical transferring step for transferring a signal accumulated in the pixel to the first holding unit; and
(2) a processing step of each of the unit cell groups conducted sequentially one color by one color and by one sub group by one sub group within one unit cell group, wherein the processing step (2) comprises:
(a) a second vertical transfer step for selecting, by the first selecting unit, the first holding unit holding the signals of the different color components one group by one group of the unit cells, and for transferring the held signal to the second holding unit; and
(b) a first horizontal transfer step for connecting, by the second selecting unit, the common output line corresponding to the signal of the color component held by the second holding unit connected to the second selecting unit with the second holding unit connected to the second selecting unit, and for outputting the signals held by the second holding units in unit cell groups sequentially one unit cell by one unit cell to the common output lines connected by the second selecting unit.

Other features and advantages of the present invention will be apparent from the following description taken in conjunction with the accompanying drawings, in which like reference characters designate the same or similar parts throughout the figures thereof.

The accompanying drawings, which are incorporated in and constitute a part of the specification, illustrate embodiments of the invention and, together with the description, serve to explain the principles of the invention.

DESCRIPTION OF THE EMBODIMENTS

In the following, solid-sate imaging apparatus according to embodiments of the present invention will be described with reference to the attached drawings. Incidentally, the present invention is not limited to the following embodiments.

(First Embodiment)

Figure 1:
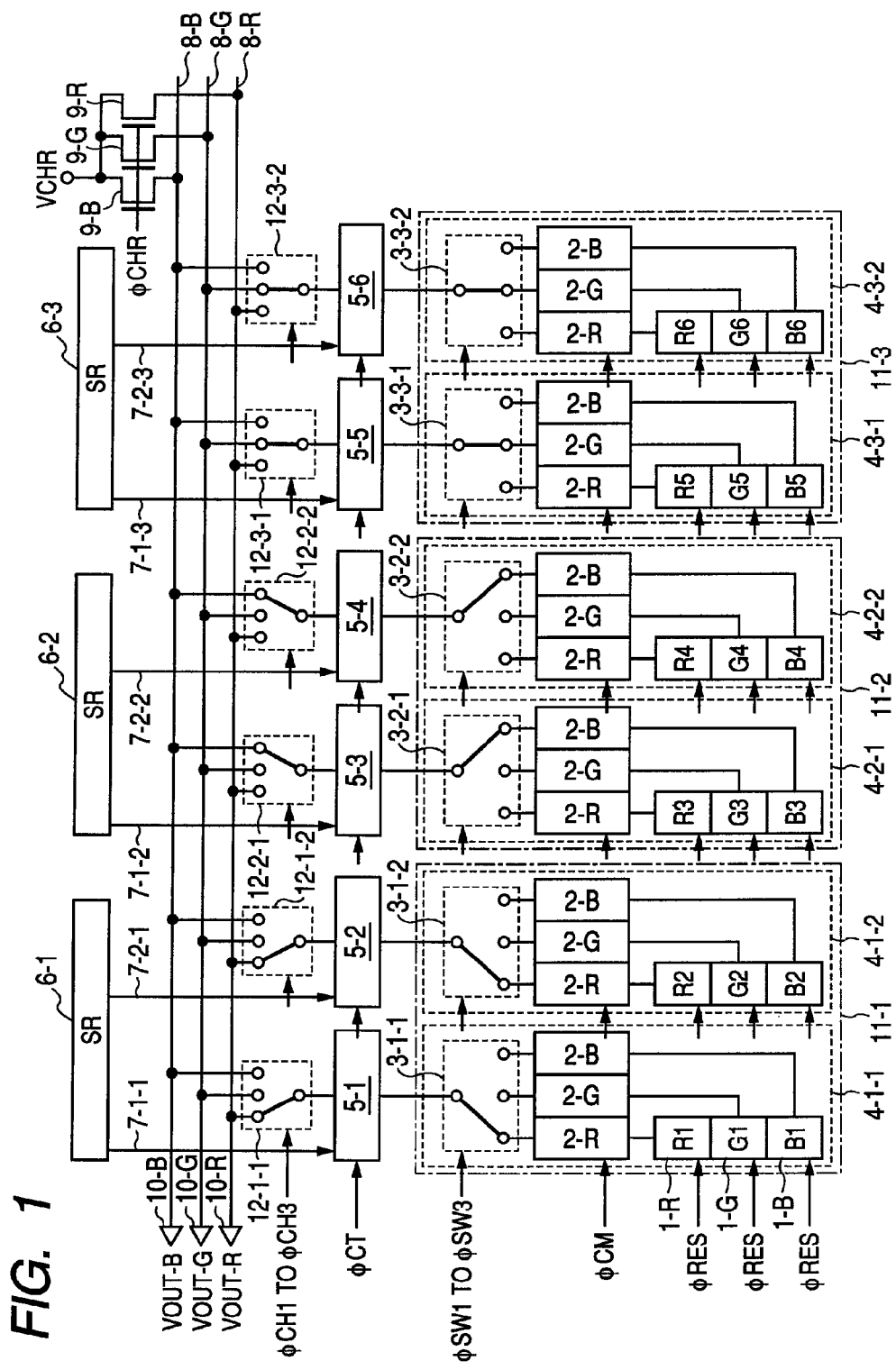
FIG. 1 is a diagram illustrating a configuration example of a solid-state imaging apparatus according to a first embodiment of the present invention.

FIG. 1 illustrates a configuration example of a solid-state imaging apparatus according to a first embodiment of the present invention, and expresses a color line sensor of 6 bits×3 colors. In the configuration of FIG. 1, each of unit cell groups 11-1 to 11-3 includes two unit cells. The unit cell group 11-1 includes unit cells 4-1-1 and 4-1-2; the unit cell group 11-2 includes unit cells 4-2-1 and 4-2-2; and the unit cell group 11-3 includes unit cells 4-3-1 and 4-3-2. Each of the unit cells 4-1-1 to 4-3-2 includes pixels 1-R, 1-G, and 1-B detecting red (R), green (G), and blue (B) lights, respectively, and intermediate holding units 2-R, 2-G, and 2-B holding the signals from the pixels 1-R, 1-G, and 1-B, respectively. The intermediate holding units 2-R, 2-G, and 2-B are first holding units. Moreover, each of the unit cells 4-1-1 to 4-3-2 includes each of selecting switches 3-1-1 to 3-3-2, which are first selecting units. Each of the selecting switches 3-1-1 to 3-3-2 selects one of the signals held by the intermediate holding units 2-R, 2-G, and 2-B, provided in each of the unit cells 4-1-1 to 4-3-2, and outputs the selected signal. Incidentally, although the unit cells 4-1-1 to 4-3-2 read the respective components of the R, G, and B pixels in the present embodiment, the unit cells 4-1-1 to 4-3-2 may read the respective components of cyan, magenta, and yellow pixels, and may read the respective components of four or more colors of pixels. If each component of four or more colors of pixels is read, the intermediate holding units are provided as many as the number of the pixels. It is supposed that each of the unit cells 4-1-1 to 4-3-2 is configured so that one color is allotted to one pixel here. Each of the unit cells 4-1-1 to 4-3-2 is equipped with the selecting units and the intermediate holding units 2-R, 2-G, and 2-B besides the pixels 1-R, 1-G, and 1-B in the present embodiment, some pixels may includes the intermediate holding units.

In the configuration of FIG. 1, holding units 5-1 to 5-6 holds the signals from the selecting switches 3-1-1 to 3-3-2 of the unit cells 4-1-1 to 4-3-2, respectively. The holding units 5-1 to 5-6 are second holding units. In the configuration of FIG. 1, scanning circuits 6-1, 6-2, and 6-3 sequentially scan the signals from the holding units 5-1 and 5-2, 5-3 and 5-4, and 5-5 and 5-6, respectively. The scanning circuits 6-1, 6-2, and 6-3 output scanning signals 7-1-1 and 7-2-1, 7-1-2 and 7-2-2, and 7-1-3 and 7-2-3, respectively.

In the configuration of FIG. 1, common output lines 8-R, 8-G, and 8-B output the signals from the holding units 5-1 to 5-6 in accordance with the scanning signals 7-1-1 to 7-2-3. The signals from the pixels 1-R, 1-G, and 1-B are output to the common output lines 8-R, 8-G, and 8-B, respectively. In the configuration of FIG. 1, transistors 9-R, 9-G, and 9-B are used as reset units for resetting the common output lines 8-R, 8-G, and 8-B, respectively, to a voltage VCHR in response to a gate signal φCHR. In the configuration of FIG. 1, output circuits 10-R, 10-G, and 10-B amplify the signals from the common output lines 8-R, 8-G, and 8-B, respectively, and output the amplified signals. In the configuration of FIG. 1, change-over switches 12-1-1 to 12-3-2 are connected to the holding units 5-1 to 5-6, respectively, and distribute and output the color signals output from the holding units 5-1 to 5-6 in accordance with control signals φCH-1, φCH-2, and φCH-3 to the common output lines 8-R, 8-G, and 8-B, respectively. The change-over switches 12-1-1 to 12-3-2 are second selecting units.

The scanning circuits 6-1 to 6-3 are provided correspondingly to each of the unit cell groups 11-1 to 11-3, and the scanning circuits 6-1 to 6-3 first scan the holding units 5-1, 5-3, and 5-5 simultaneously in accordance with the scanning signals 7-1-1, 7-1-2, and 7-1-3, respectively. Next, the scanning circuits 6-1 to 6-3 scan the holding units 5-2, 5-4, and 5-6 simultaneously in accordance with the scanning signals 7-2-1, 7-2-2, and 7-2-3, respectively.

Incidentally, it is supposed that the reference marks R1 to R6, G1 to G6, and B1 to B6 given to the pixels 1-R, 1-G, and 1-B in FIG. 1, respectively, denote the bit numbers of the pixels 1-R, 1-G, and 1-B, respectively.

Figure 2:
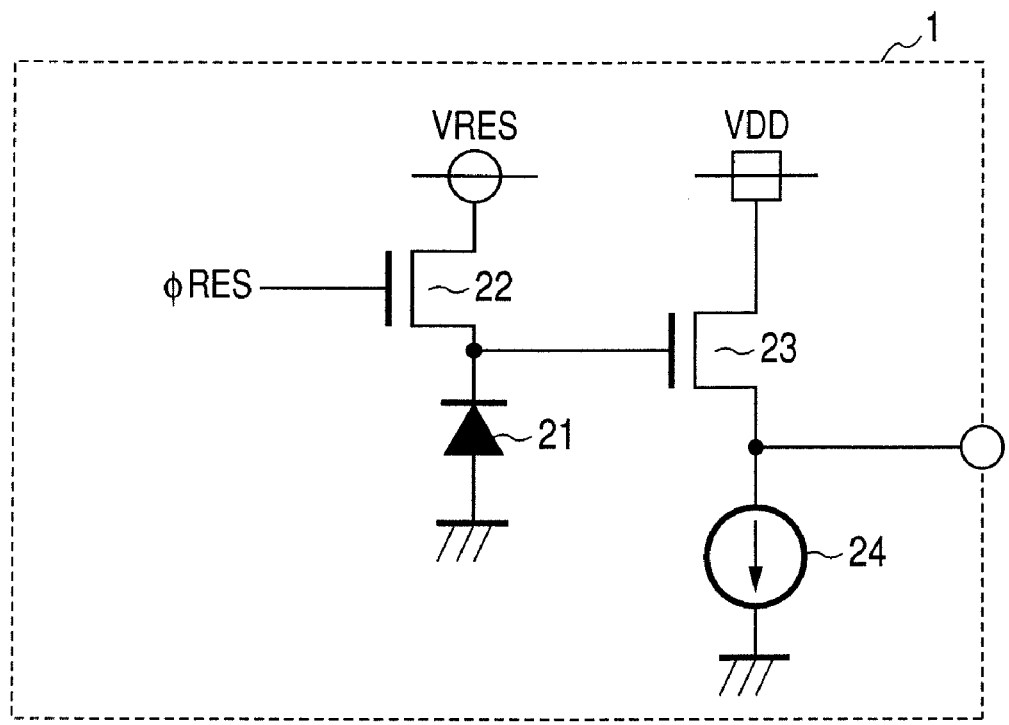
FIG. 2 is a diagram illustrating a configuration example of a pixel.

Each of the pixels 1-R, 1-G, and 1-B is configured as a configuration 1 illustrated in FIG. 2, for example. The configuration 1 of FIG. 2 includes a photoelectric conversion element 21, a reset transistor 22 for resetting the photoelectric conversion element 21 to a voltage VRES in accordance with a gate signal φRES. The configuration further includes a source follower input transistor 23 for receiving the signals from the photoelectric conversion element 21, and a source follower constant current circuit 24. The constant current circuit 24 can be realized by, for example, a MOS transistor having a gate electrode fixed to a constant voltage, a drain electrode connected to the source electrode of the source follower input transistor 23, and a source electrode connected to a power source. The photoelectric conversion element 21 can be configured of a charge coupled device (CCD) sensor or a complementary metal oxide semiconductor (CMOS) sensor with a color filter of each color arranged on the CCD or CMOS sensor.

Figure 3:
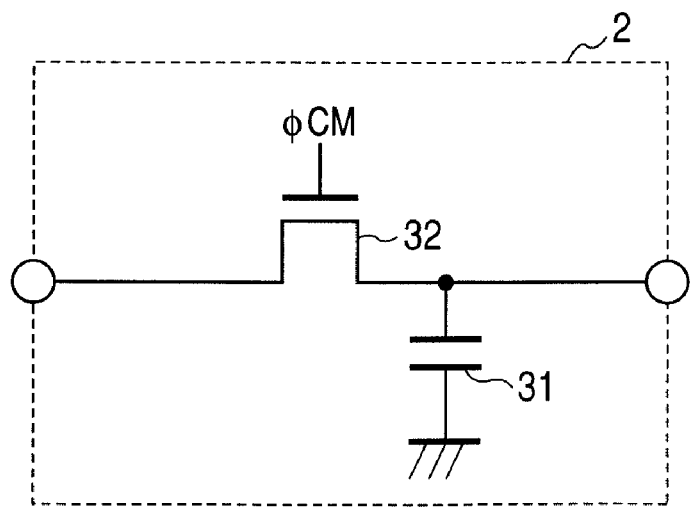
FIG. 3 is a diagram illustrating a configuration example of an intermediate holding unit.

Each of the intermediate holding units 2-R, 2-G, and 2-B is configured as a configuration 2 illustrated in FIG. 3, for example. The configuration 2 of FIG. 3 includes an intermediate holding capacity 31 and a first writing switch 32 for performing writing in accordance with a gate signal φCM.

Figure 4:
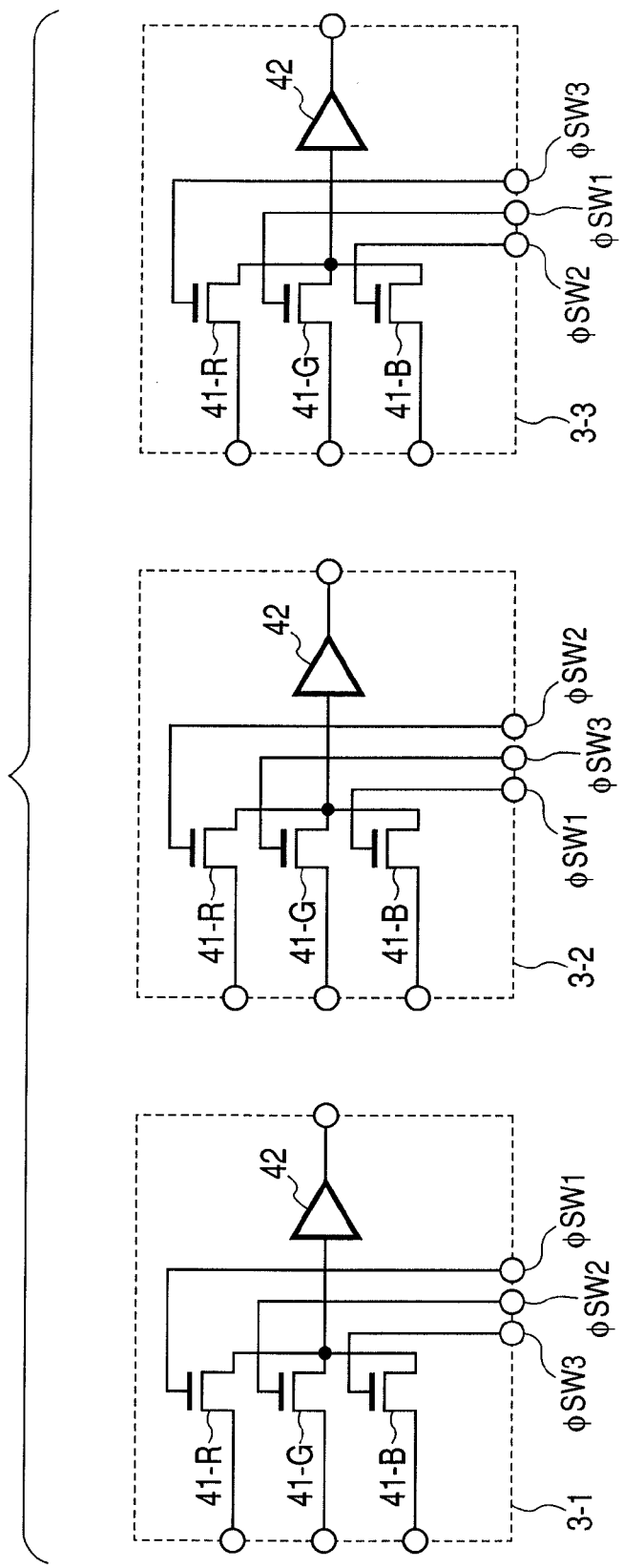
FIG. 4 is a diagram illustrating configuration examples of selecting switches.

The selecting switches 3-1-1 to 3-3-2 are configured as the configurations 3-1 to 3-3 illustrated in FIG. 4, respectively, for example. In the configurations of FIG. 4, the configuration 3-1 illustrates each of the configurations of the selecting switches 3-1-1 and 3-1-2 in the unit cells 4-1-1 and 4-1-2, respectively, included in the first unit cell group 11-1. Moreover, the configuration 3-2 illustrates each of the configurations of the selecting switches 3-2-1 and 3-2-2 in the unit cells 4-2-1 and 4-2-2, respectively, included in the second unit cell group 11-2. Moreover, the configuration 3-3 illustrates each of the configurations of the selecting switches 3-3-1 and 3-3-2 in the unit cells 4-3-1 and 4-3-2, respectively, included in the third unit cell group 11-3.

The configurations 3-1 to 3-3 in FIG. 4 include selecting transistors 41-R, 41-G, and 41-B outputting an arbitrary signal from each of the intermediate holding capacities 31 for three pixels of R, G, and B. The configurations 3-1 to 3-3 include amplifying units 42 amplifying and outputting the signals output from the selecting transistors 41-R, 41-G, and 41-B. For example, a source follower circuit is used as each of the amplifying units 42. The drain electrodes of the selecting transistors 41-R, 41-G, and 41-B are connected to the intermediate holding units 2-R, 2-G, and 2-B corresponding to the respective colors, respectively, and the source electrodes of the selecting transistors 41-R, 41-G, and 41-B are commonly connected to the inputs of the amplifying units 42. The gate electrodes of the selecting transistors 41-R, 41-G, and 41-B are wired to mutually different control signals φSW1 to φSW3, respectively. The signal of an arbitrary intermediate holding capacity 31 is selected in accordance with the control signals φSW1 to φSW3. Moreover, although the amplifying units 42 are arranged at the subsequent stages of the selecting transistors 41-R, 41-G, and 41-B in the configurations 3-1 to 3-3 of FIG. 4, the amplifying units 42 may be arranged at the preceding stages of the selecting transistors 41-R, 41-G, and 41-B. Moreover, the configurations 3-1 (selecting switches 3-1-1 and 3-1-2), 3-2 (selecting switches 3-2-1 and 3-2-2), and 3-3 (selecting switches 3-3-1 and 3-3-2) are supposed to have the connection relations illustrated in FIG. 4 with the control signals φSW1 to φSW3. That is, in the configuration 3-1, the control signals φSW1, φSW2, and φSW3 are input into the gates of the selecting transistors 41-R, 41-G, and 41-B, respectively. In the configuration 3-2, the control signals φSW2, φSW3, and φSW1 are input into the gates of the selecting transistors 41-R, 41-G, and 41-B, respectively. In the configuration 3-3, the control signals φSW3, φSW1, and φSW2 are input into the gates of the selecting transistors 41-R, 41-G, and 41-B, respectively.

Thereby, in the unit cell groups 11-1, 11-2, and 11-3, the selecting switches 3-1-1, 3-2-1, and 3-3-1; and 3-1-2, 3-2-2, and 3-3-2 can severally select the intermediate holding units 2-R, 2-G, and 2-B having the color components different from one another.

Figure 5:
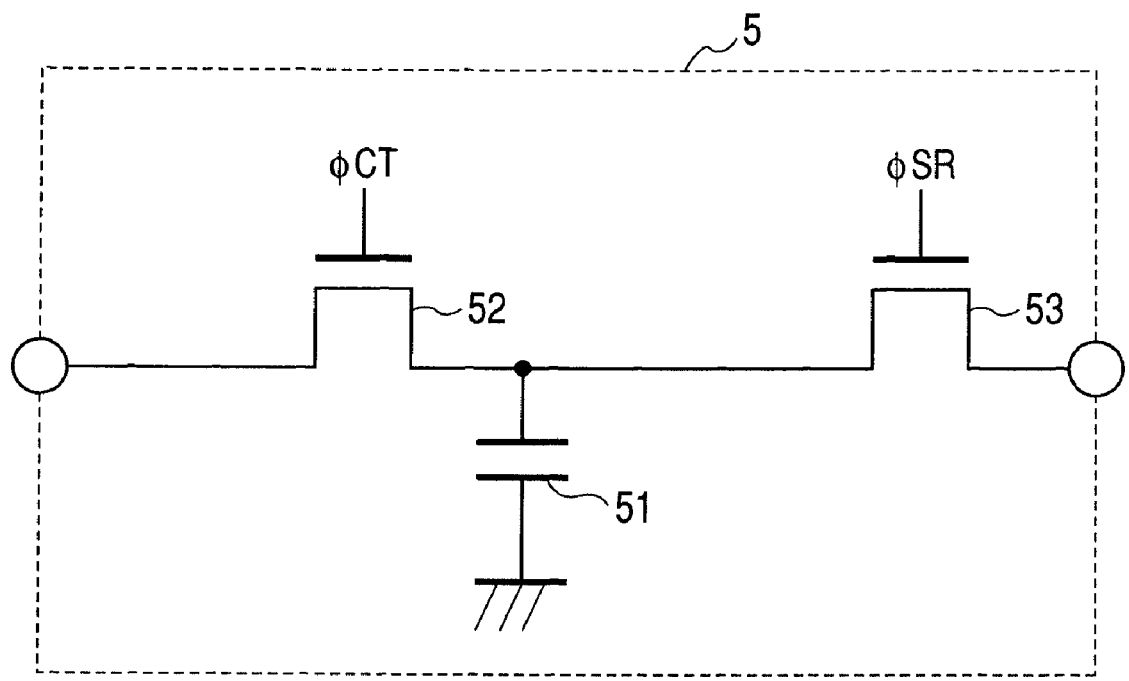
FIG. 5 is a diagram illustrating a configuration example of a holding unit.

Each of the holding units 5-1 to 5-6 is configured as a configuration 5 illustrated in FIG. 5, for example. The configuration 5 is formed of a holding capacity 51, a second writing switch 52 performing writing in accordance with a control signal φCT, and a transfer switch 53 transferring the signal of the holding capacity 51 to one of the common output lines 8-R, 8-G, and 8-B. The transfer switch 53 transfers the signal in accordance with any of the scanning signals 7-1-1 to 7-2-3 (denoted by φSR in the diagram) from the scanning circuits 6-1 to 6-3, respectively.

Figure 6:
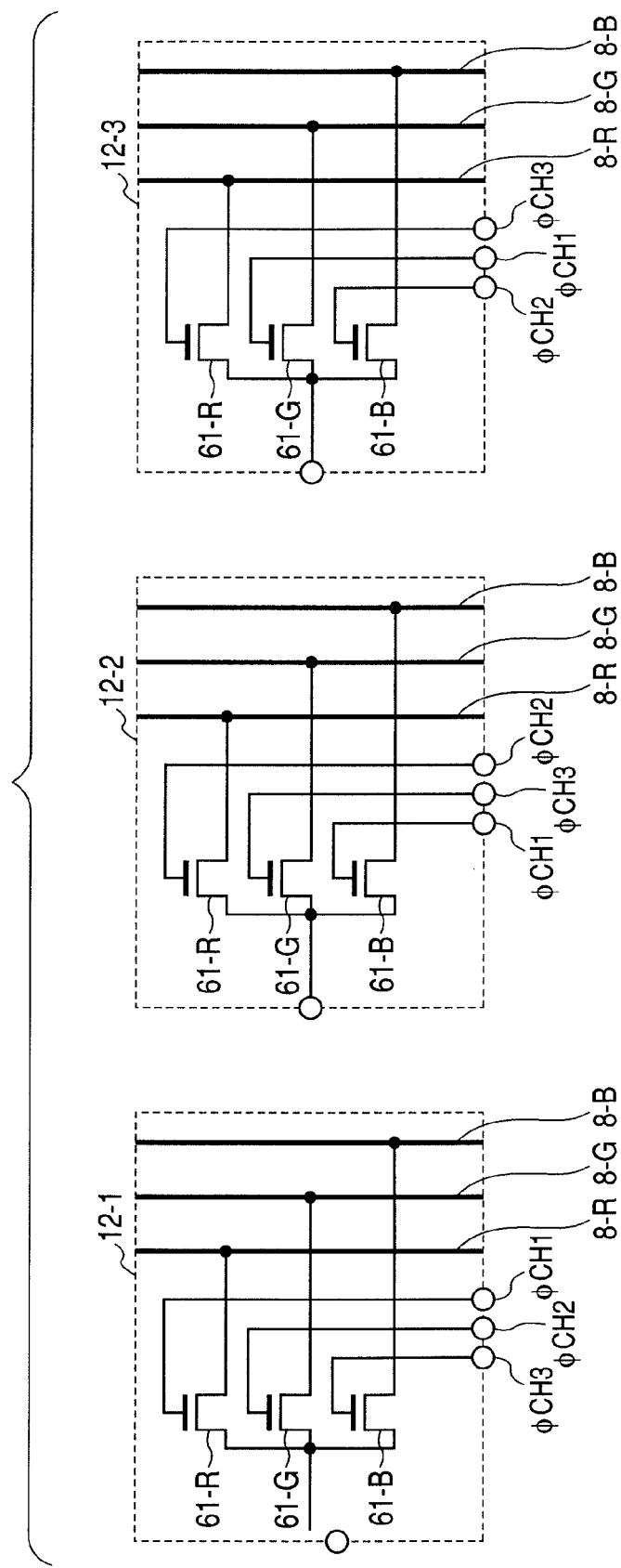
FIG. 6 is a diagram illustrating configuration and connection examples of change-over switches.

The change-over switches 12-1-1 to 12-3-2 are configured as the configurations 12-1 to 12-3 illustrated in FIG. 6, respectively, for example. Incidentally, in the configurations 12-1 to 12-3 of FIG. 6, common output lines 8-R, 8-G, and 8-B are also illustrated. In FIG. 6, the configurations 12-1, 12-2, and 12-3 illustrate each of the configurations of the change-over switches 12-1-1 and 12-1-2, 12-2-1 and 12-2-2, and 12-3-1 and 12-3-2, respectively.

The configurations 12-1 to 12-3 in FIG. 6 include switching transistors 61-R, 61-G, and 61-B, each switching the signal from the holding capacity 51 provided correspondingly to each of the unit cells 4-1-1 to 4-3-2 to output the signal to one of the common output lines 8-R, 8-G, and 8-B. The gates of the switching transistors 61-R, 61-G, and 61-B are wired to severally different control signals φCH1 to φCH3. An arbitrary signal is selected in accordance with the control signals φCH1 to φCH3 to be output to the common output lines 8-R, 8-G, and 8-B. The configurations 12-1 (change-over switches 12-1-1 and 12-1-2), 12-2 (change-over switches 12-2-1 and 12-2-2), and 12-3 (change-over switches 12-3-1 and 12-3-2) are supposed to have the connection relations illustrated in FIG. 6 with the control signals φCH1 to φCH3. That is, in the configuration 12-1, the control signals φCH1, φCH2, and φCH3 are input into the gates of the switching transistors 61-R, 61-G, and 61-B, respectively. In the configuration 12-2, the control signals φCH2, φCH3, and φCH1 are input into the gates of the switching transistors 61-R, 61-G, and 61-B, respectively. In the configuration 12-3, the control signals φCH3, φCH1, and φCH2 are input into the gates of the switching transistors 61-R, 61-G, and 61-B, respectively.

Thereby, in the unit cell groups 11-1, 11-2, and 11-3, the change-over switches 12-1-1, 12-2-1, and 12-3-1; and 12-1-2, 12-2-2, and 12-3-2 can severally select the common output lines 8-R, 8-G, and 8-B having the color components different from one another.

Next, the operation of the present embodiment will be described with reference to the flow chart of FIG. 7 and the timing chart of FIG. 8.

Figure 7:
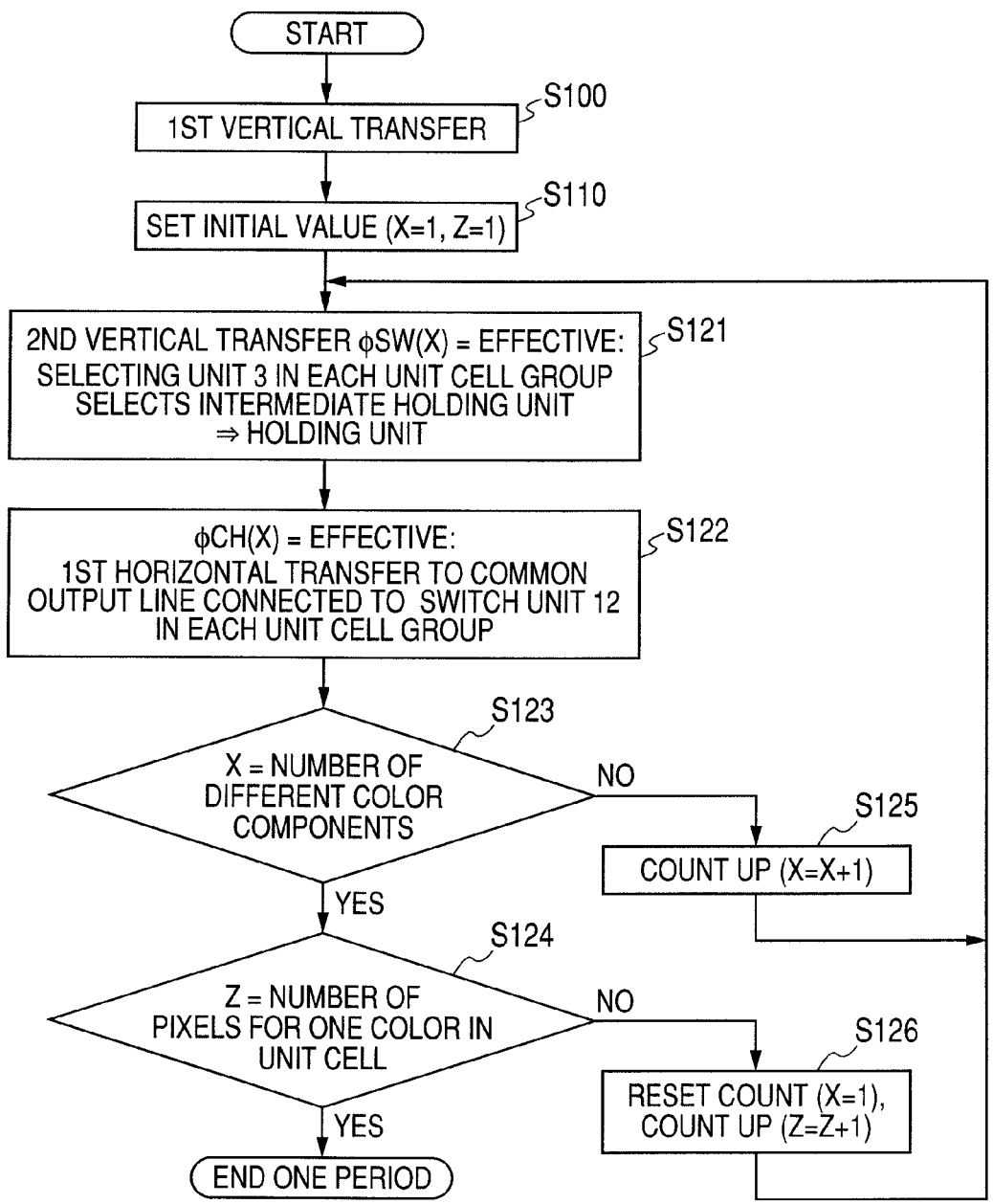
FIG. 7 is a flow chart pertaining to the first embodiment of the present invention.
Figure 8:
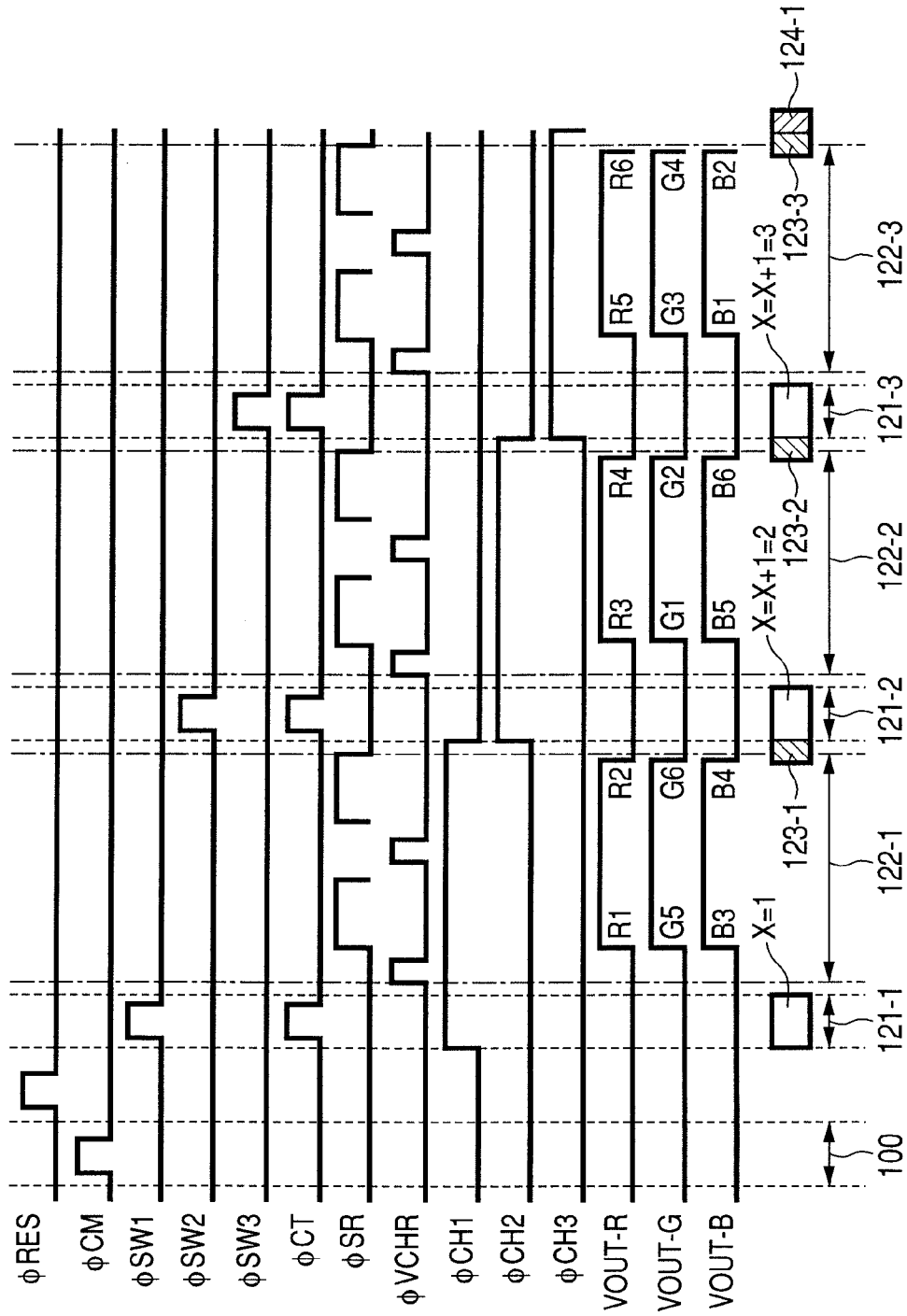
FIG. 8 is a timing chart pertaining to the first embodiment of the present invention.

In FIG. 7, at Step S100, a first vertical transfer operation of transferring the signal of the whole pixel of the pixel 1 to the intermediate holding unit 2 is performed in a period 100 of FIG. 8.

At Step S121, second vertical transfer operations of transferring the signals held in arbitrary intermediate holding capacities 2-R, 2-G, and 2-B selected by the configurations 3 (selecting switches 3-1-1, 3-2-1, and 3-3-1; and 3-1-2, 3-2-2, and 3-3-2) to the holding units 5-1 to 5-6 in periods 121-1, 121-2, and 121-3.

At Step S122, first horizontal transfer operations of transferring the signals held in the holding units 5-1 to 5-6 to the common output lines 8-R, 8-G, and 8-B in parallel are performed in synchronization with the scanning of the scanning circuits 6-1 to 6-3 and the switching of the change-over switches 12-1-1 to 12-3-2 in periods 122-1, 122-2, and 122-3.

At Step S123, first determination is executed. In the first determination, a variable X is supposed, and, after the variable X has changed in accordance with the flow chart of FIG. 7, it is determined whether the value of the changed variable X is the same number (YES) or not (NO) as the number of color components (three in the present embodiment) for determining the next operation. The processing of the first determination at Step S123 can be realized by, for example, a first counter counting the number of times of the second vertical transfer operations (at Step S121) as the variable X.

At Step S124 second determination is executed. In the second determination, a variable Z is supposed, and, after the variable Z has changed in accordance with the flow chart of FIG. 7, it is determined whether the variable Z is the same number (YES) or not (NO) as the number of pixels per color component in the unit cell 4 (one in the present embodiment) for determining the next operation. The second determination can be realized by, for example, a second counter counting the number of times of the determination results YES in the first determination processing at Step S123 as the variable Z.

As illustrated in FIG. 8, the levels of the control signals φSW1, φSW2, and φSW3 are changed to the High levels in the second vertical transfer periods 121-1, 121-2, and 121-3, respectively. Thereby, the signals of the intermediate holding units 2-R, 2-G, and 2-B selected by the selecting switches 3-1-1 to 3-3-2 in each of the unit cell groups 11-1 to 11-3 are written in the holding units 5-1 to 5-6. The levels of the control signals φCH1, φCH2, and φCH3 are changed to the High levels in the first horizontal transfer periods 122-1 to 122-3, respectively. Thereby, each of the holding units 5-1 to 5-6 is connected to the common output lines 8-R, 8-G, and 8-B through the change-over switches 12-1-1 to 12-3-2, and sequential outputting is performed in response to the scanning of the scanning circuits 6-1 to 6-3.

In the following, a further detailed description will be given.

First, during an accumulation time (not illustrated) of an incident light in the photoelectric conversion element 21, the signal converted into an electric signal by the photoelectric conversion element 21 is output from the source electrode of the source follower input transistor 23.

In the first vertical transfer period 100 of FIG. 8 (at Step S100 of FIG. 7), the signals of all of the pixels 1-R, 1-G, and 1-B in the unit cell groups 11-1 to 11-3 are written into the intermediate holding units 2-R, 2-G, and 2-B connected to the pixels 1-R, 1-G, and 1-B, respectively, in the High level period of the control signal φCM. Then, the signal values are held at the time of the fall of the control signal φCM.

Next, the initial values of the first and second counters are set to 1 (X=Z=1) (at Step S110 of FIG. 7).

Next, the levels of the control signals φSW1 and φCT are changed to the High levels in the first second vertical transfer period 121-1 of FIG. 8. Thereby, the selecting switches 3-1-1 to 3-3-2 select the intermediate holding units 2-R, 2-G, and 2-B in the following relations in each of the unit cell groups 11-1 to 11-3, and the signal of each color component is written into the respective holding units 5-1 to 5-6. The selections of the selecting switches 3-1-1 to 3-3-2 are as follows:
11) unit cells 4-1-1 and 4-1-2 ⇒ intermediate holding units 2-R of R component;
12) unit cells 4-2-1 and 4-2-2 ⇒ intermediate holding units 2-B of B component; and
13) unit cells 4-3-1 and 4-3-2 ⇒ intermediate holding units 2-G of G component.

Moreover, by changing the level of the control signal φCH1 to the High level, the holding units 5-1 to 5-6 connected to each of the unit cell groups 11-1 to 11-3 are connected to each of the common output lines 8-R, 8-G, and 8-B through the change-over switches 12-1-1 to 12-3-2 in the following relations. The switching operations are completed at least before the next first horizontal transfer. The connections of the holding units 5-1 to 5-6 are as follows:
21) holding units 5-1 and 5-2 ⇒ common output line 8-R of R component;
22) holding units 5-3 and 5-4 ⇒ common output line 8-B of B component; and
23) holding units 5-5 and 5-6 ⇒ common output line 8-G of G component.

After the completion of the first second vertical transfer period 121-1, the signals held in the holding units 5-1, 5-3, and 5-5 are sequentially output to the common output lines 8-R, 8-G, and 8-B, respectively, in response to the scanning of each of the scanning circuits 6-1, 6-2, and 6-3, respectively, in a first horizontal transfer period 122-1. After that, the signals held in the holding units 5-2, 5-4, and 5-6 are sequentially output to the common output lines 8-R, 8-G, and 8-B, respectively.

Next, because the result of a first determination (at Step S123 in FIG. 7) in a period 123-1 is "NO" owing to the variable X=1, the first counter is counted up (X=X+1=2) (at Step S125 of FIG. 7), and a second vertical transfer is performed in a period 121-2. Because the control signal φSW2 is the High level, the selection of the selecting switches 3-1-1 to 3-3-2 are as follows:
31) unit cells 4-1-1 and 4-1-2 ⇒ intermediate holding units 2-G of G component;
32) unit cells 4-2-1 and 4-2-2 ⇒ intermediate holding units 2-R of R component; and
33) unit cells 4-3-1 and 4-3-2 ⇒ intermediate holding units 2-B of B component.

Next, because the level of the control signal φCH2 is the High level, the switching of the change-over switches 12-1-1 to 12-3-2 is performed as follows:
41) holding units 5-1 and 5-2 ⇒ common output line 8-G of G component;
42) holding units 5-3 and 5-4 ⇒ common output line 8-R of R component; and
43) holding units 5-5 and 5-6 ⇒ common output line 8-B of B component.

In this connection relation, the signals are read from the common output lines 8-B, 8-G, and 8-R in a second first horizontal transfer period 122-2. Successively, a second first determination (Step S123) is performed at a period 123-2 (result: NO), and the count up of the variable X (X=X+1=3) is performed. Then, a third second vertical transfer is performed in a period 121-3, and a third first horizontal transfer is performed in a period 122-3.

Next, the result of a third first determination (at Step S123 in FIG. 7) in a period 123-2 is "YES" owing to the variable X=3, and a second determination (at Step S124 in FIG. 7) in a period 124-1 is "YES" owing to the variable Z=1. Consequently, a period from the accumulation to the reading ends. At this time point, the signals of all the pixels have been read. The reading order is as illustrated in the items VOUT-R, VOUT-G, and VOUT-B in FIG. 8, and the signal of one color component can be output from each of the common output lines 8-B, 8-G, and 8-R similarly to that in the conventional configuration. Moreover, as a result, the reading of all of the pixels can be preformed with the increasing of the total reading time only by the second and third second vertical transfer time in comparison with that of the conventional configuration. Incidentally, in the case of the configuration equipped with no change-over switches 12-1-1 to 12-3-2, it is difficult to output only one color component from each of the common output lines 8-B, 8-G, and 8-R, as it is apparent from the description until now. Consequently, even if the solid-state imaging apparatus of the present embodiment is used in a color copier and the like, it becomes unnecessary to change the gains of the amplifier circuits 42 of the subsequent stage in a reading period, or to add signal path change-over switches.

The level of the control signal φRES resetting the photoelectric conversion element 21 can be changed to the High level at arbitrary timing as long as the timing is on and after the change of the control signal φCM here. However, also in order to take the accumulation time as long as possible, it is preferable to change the level of the control signal φRES from the time just after the first vertical transfer to the time just before the first horizontal transfer in a period 102-1.

Moreover, although the present embodiment has been described on the basis of the three color components of R, G, and B, the embodiment may be configured of arbitrary number of colors of arbitrary color components. Moreover, the configuration of having a plurality of common output lines per color may be adopted. In that case, each color output is output in parallel with one another.

Moreover, the number of pixels per color in the unit cell 4 may be plural. In this case, the number of pixels included in the unit cell 4 is X (colors)×Z (number), and the result of the first second determination in the period 124-1 (at Step S124 of FIG. 7) is "NO." Then, the second counter is counted up (Z=Z+1=2) (at Step S126 of FIG. 7), and the operation is continued in accordance with the flow chart of FIG. 7.

The sizes of the intermediate holding capacity 31 and the holding capacity 51 are described here. As described with regard to the conventional technique, for example, if the capacity value of each of the common output lines 8-B, 8-G, and 8-R is set to 15 pF and the reading gain Gc is set to ⅕, the conventional configuration needs the size of the holding capacity 51 of 9.0 μm×144.8 μm in order to realize the 3 pF. If a line sensor having three lines is realized by the conventional configuration, then it is needed to arrange holding capacities 51 for three colors in a pixel width (=10 μm) because three pixels of the three colors (three color components) are arranged per column. The total size of the holding capacities 51 at this time is 9.0 μm×144.8 μm×3 (number of pixels).

On the other hand, in the case of the present embodiment, the capacity value of the intermediate holding capacity 31 does not influence the reading gain, and consequently the intermediate holding capacity 31 is not required to be enlarged to the size of the holding capacity 51. For example, if the capacity value of the intermediate holding capacity 51 is supposed to be 0.5 pF so that the kTC noises may be 0.1 mV or less, then one holding capacity and three intermediate holding capacities take 9.0 μm×144.8 μm+9.0 μm×24.1 μm×3 (number of pixels). If the differences between both of the sizes in the length directions, then the difference is 144.8 μm×3 (number of pixels)−(144.8 μm+24.1 μm×3 (number of pixels))=217.2 μm. The chip size can be reduced by the above-mentioned degree in comparison with the conventional configuration, and consequently the reduction is especially effective in a color sensor having a plurality of lines. Furthermore, although the calculations have been performed on the supposition that the number of pixels having the same colors in a unit cell is one, if the number of pixels having the same colors is supposed to be two or more, then the greater reduction of the chip size can be realized.

Figure 9:
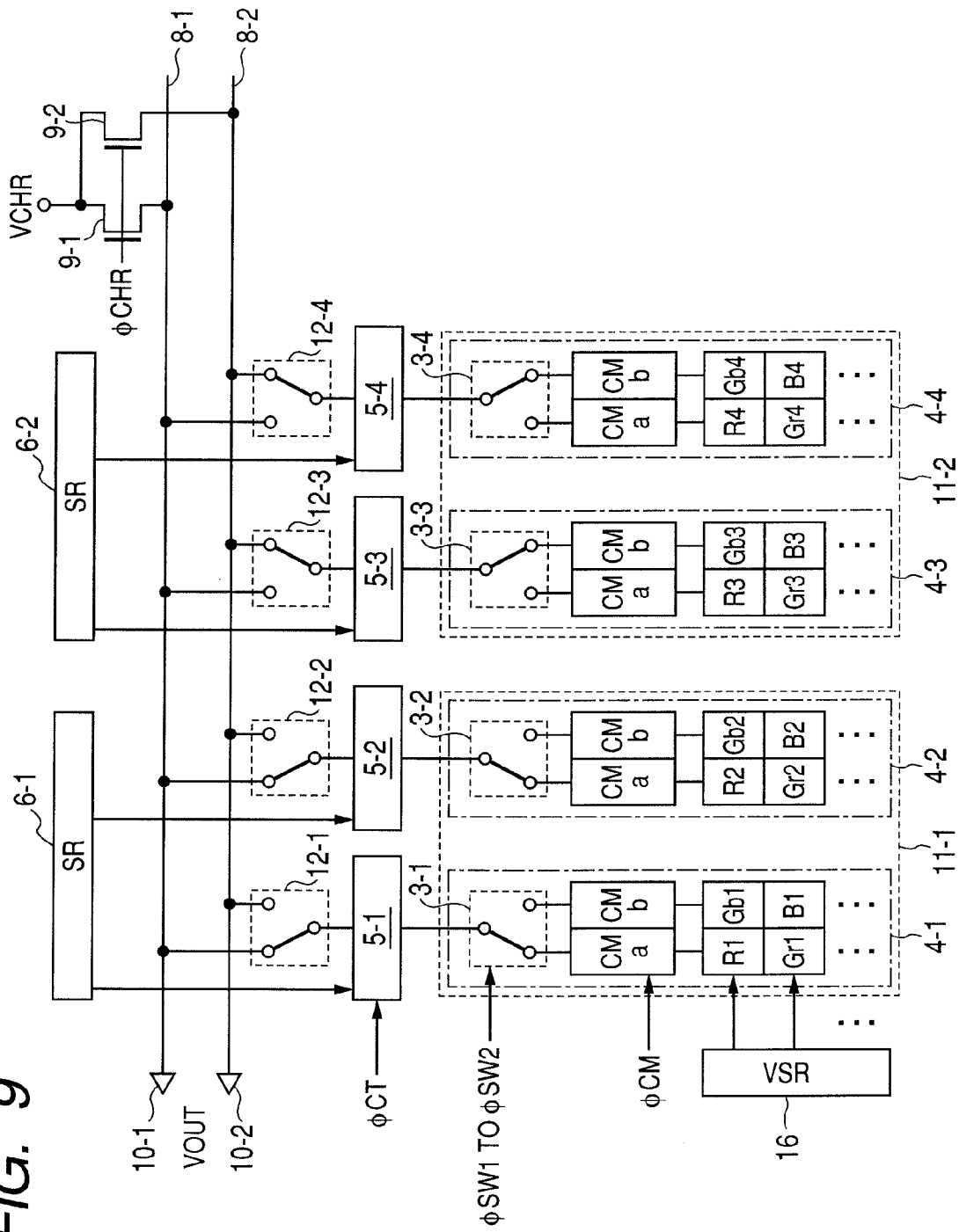
FIG. 9 is a diagram illustrating a configuration example of another solid-state imaging apparatus according to the first embodiment of the present invention.

The present embodiment has been described as the line sensor until now, but the present embodiment can adopt the configuration of an area sensor. FIG. 9 illustrates a configuration example of the area sensor. In an area sensor, a plurality of pixels is arranged in column directions and directions different from the column directions, that is, the plurality of pixels is arranged in a matrix.

In the configuration of FIG. 9, a vertical scanning circuit 16 sequentially selects rows one by one. Each of unit cells 4-1 to 4-4 includes the pixels of a plurality of columns and all of the rows, and a vertical output line per column, which are shared by the column. In case of taking notice of a row, the operation of the configuration is the same as that of the line sensor, the description of which is omitted here. The present configuration example is configured so as to share one of the holding units 5-1 to 5-4 by the two columns.

In the configuration of FIG. 9, the unit cell groups 11-1 and 11-2 severally include the two unit cells 4-1 and 4-2, and 4-3 and 4-4, respectively. Each of the unit cells 4-1 to 4-4 includes a pixel R, two pixels G, and a pixel B, which detect red, green, and blue color lights, respectively, and intermediate holding units CMa and CMb holding the signals from the pixels R and G, and G and B, respectively. The intermediate holding units CMa and CMb are the first holding units. Moreover, the unit cells 4-1 to 4-4 severally include one of selecting switches 3-1 to 3-4, which are the first selecting units. Each of the selecting switches 3-1 to 3-4 selects a signal between the signals held in the intermediate holding units CMa and CMb provided in each of the unit cells 4-1 to 4-4, and outputs the selected signal.

In the configuration of FIG. 9, the holding units 5-1 to 5-4 hold the signals from the selecting switches 3-1 to 3-4 in the unit cells 4-1 to 4-4, respectively. The holding units 5-1 to 5-4 are the second holding units. The scanning circuits 6 sequentially scan the signals from the holding units 5-1 to 5-4.

In the configuration of FIG. 9, transistors 9-1 and 9-2, which are the reset units, reset common output lines 8-1 and 8-2, respectively, to the voltage VCHR according to the gate signal φCHR. Output circuits 10-1 and 10-2 amplify the singles from the common output lines 8-1 and 8-2, respectively, and output the amplified signals. Change-over switches 12-1 to 12-4 are connected to the holding units 5-1 to 5-4, respectively, and distribute the color signals output from the holding units 5-1 to 5-4, respectively, to the common output lines 8-1 and 8-2 in accordance with control signals φCH-1 and φCH-2 to output the distributed color signals. The change-over switches 12-1 to 12-4 are the second selecting units.

FIG. 9 illustrates the configuration of reading a color signal having the same color as that of a pixel row that is being read to a horizontal output line. If the pixels of R, G, and B color components that detects red, green, and blue color lights, respectively, are arranged in the Bayer array, then the color arrangements in an even row and in an odd row are different from each other. Consequently, the configuration is not the one always outputting the same color to one horizontal output line. However, when the signals on a pixel row are read, the signals having the same color are read to one of the horizontal output lines 8-1 and 8-2.

In the example illustrated in FIG. 9, because two common output lines 8-1 and 8-2 are provided, all of the unit cells 4-1 to 4-4 are classified into the two unit cell groups 11-1 and 11-2. The number of the unit cell groups 11-1 and 11-2 can be suitably changed according to the number of the common output lines 8-1 and 8-2. If the number of the common output lines 8-1 and 8-2 becomes three or more, then a plurality of common output lines through which a color component R is output is provided sometimes, or a plurality of common output lines through which a color component G is output is provided sometimes, when the signal of a predetermined pixel row is read to the common output lines. In this case, the number of the scanning circuits SR further increases. Moreover, if the numbers of the second holding units and the change-over switches 12-1 to 12-4 are increased by suitably increasing the number of the unit cells 4-1 to 4-4 in each of the unit cell groups 11-1 and 11-2, then a Gb pixel can be read with the shift register 6-2 when an R pixel is being read with the shift register 6-1, even if the number of pixels increases.

As described above, in the first embodiment of the present invention, the solid-state imaging apparatus outputting pixel signals of each of a plurality of color components R, G, and B use the intermediate holding units 2-R, 2-G, and 2-B (CMa and CMb) and the first selecting units, and severally share one of the holding units 5-1 to 5-6 (5-1 to 5-4) by the unit cell. The solid-state imaging apparatus are further provided with the second selecting units between the holding units 5-1 to 5-6 (5-1 to 5-4) and the common output lines 8-B, 8-G, and 8-R, (8-1 and 8-2) and classify all of the unit cells 4-1-1 to 4-3-2 (4-1 to 4-4) into the same numbers of unit cell groups 11-1 and 11-3 (11-1 and 11-2) as the numbers of colors to read signals of different color components from the respective unit cell groups 11-1 to 11-3 (11-1 and 11-2) in parallel. Thereby, the solid-state imaging apparatus can be severally configured to be smaller in area in comparison with the conventional configuration, which has a holding unit to each of the pixels. Moreover, the solid-state imaging apparatus can read all the pixels 1-R, 1-G, and 1-B (R, G, and B) only with the increase of the second and third second vertical transfer time in comparison with the time of the conventional configuration.

(Second Embodiment)

Figure 10:
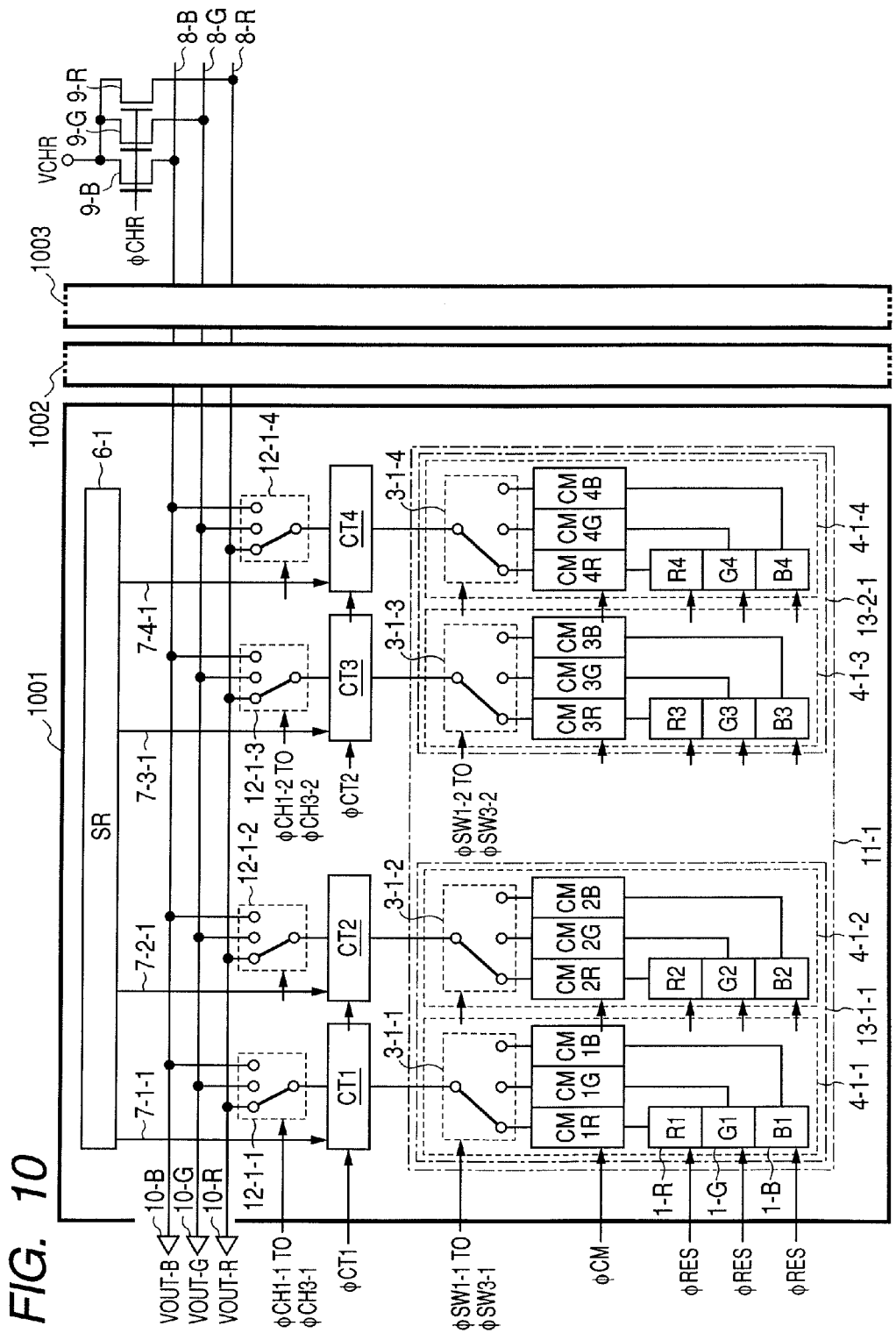
FIG. 10 is a diagram illustrating a configuration example of a solid-state imaging apparatus according to a second embodiment of the present invention.

FIG. 10 illustrates a configuration example of a solid-state imaging apparatus according to a second embodiment of the present invention. The same components as those in FIG. 1 describe above are denoted by the same reference numbers as those in FIG. 1, and their descriptions are omitted.

The color line sensor of the present embodiment includes three color components of R, G, and B colors in each pixel similarly to the first embodiment, and 12 bits per color to be 12 bits×3 colors in total.

Figure 13:
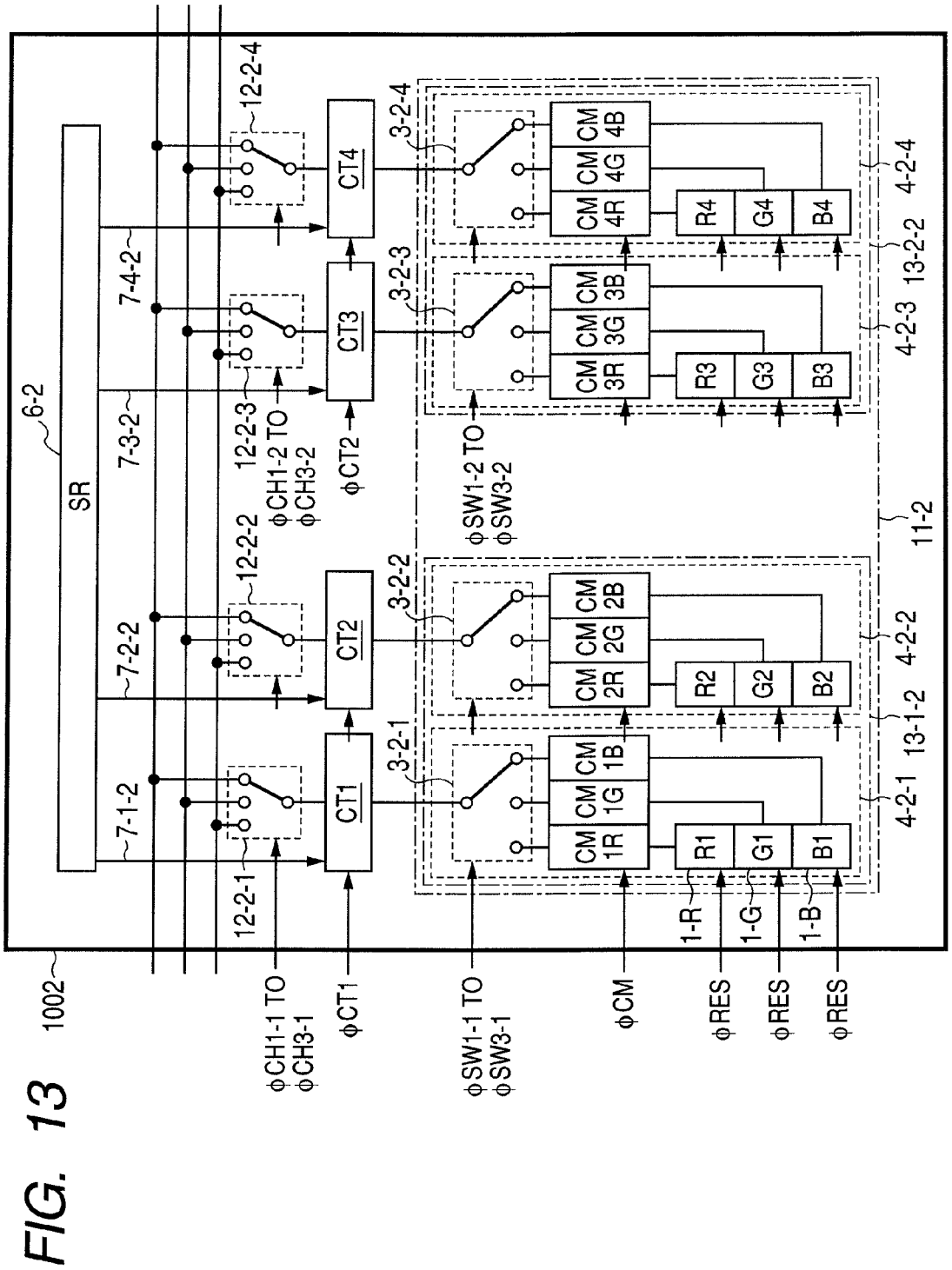
FIG. 13 is a diagram illustrating the internal configuration of a unit 1002 in FIG. 10.
Figure 14:
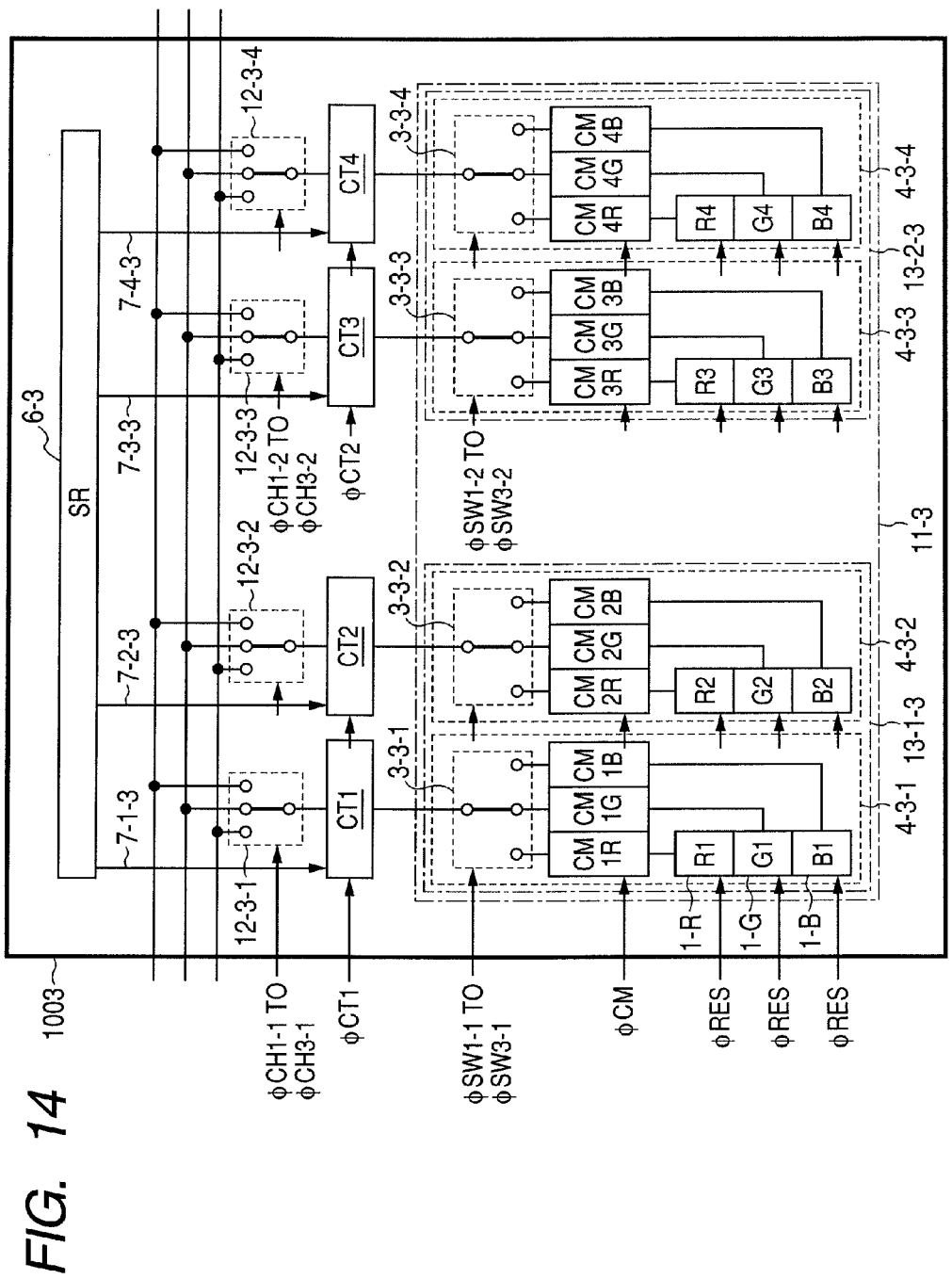
FIG. 14 is a diagram illustrating the internal configuration of a unit 1003 in FIG. 10.

The unit cell groups 11-1 to 11-3 are classified to be the same number three as that of the colors similarly to the first embodiment. In the configuration of FIG. 10, the solid-state imaging apparatus is illustrated to be divided into three units 1001, 1002, and 1003, but only the internal configuration of the unit 1001 is illustrated for simplifying the description. FIGS. 13 and 14 illustrate the internal configurations of the units 1002 and 1003, respectively.

The differences among the internal configurations of the units 1001, 1002, and 1003 exist in the configurations of the selecting switches 3-1-1 to 3-3-4 and the change-over switches 12-1-2 to 12-3-4. That is, the selecting switches 3-1-1 to 3-1-4, 3-2-1 to 3-2-4, and 3-3-1 to 3-3-4 of the respective units 1001, 1002, and 1003 correspond to the selecting switches 3-1, 3-2, and 3-3 of FIG. 4, respectively. Moreover, the change-over switches 12-1-1 to 12-1-4, 12-2-1 to 12-2-4, and 12-3-1 to 12-3-4 of the respective units 1001, 1002, and 1003 correspond to the change-over switches 12-1, 12-2, and 12-3 of FIG. 6, respectively.

As illustrated in FIG. 10, the unit 1001 includes the unit cell group 11-1, holding units CT1 to CT4, change-over switches 12-1-1 to 12-1-4, and the scanning circuit 6-1.

In the configuration of the unit 1001, all of the unit cells 4-1-1 to 4-1-4 in the unit cell group 11-1 are classified into a plurality of (two in the present embodiment) unit cell sub groups 13-1-1 and 13-2-1. The configurations of selecting switches 3-1-1 to 3-1-4 are the same as that of the selecting switch 3-1 of FIG. 4. However, control signals φSW1-1, φSW2-1, and φSW3-1 are input into the selecting switches 3-1-1 and 3-1-2 in the unit cell sub group 13-1-1, and control signals φSW1-2, φSW 2-2, and φSW3-2 are input into the selecting switches 3-1-3 and 3-1-4 in the unit cell sub group 13-2-1. Similarly, the configurations of the change-over switches 12-1-1 to 12-1-4 are the same as that of the change-over switch 12-1 of FIG. 6. However, the control signals φCH1-1, φCH2-1, and φCH3-1 are input into the change-over switches 12-1-1 and 12-1-2 corresponding to the unit cell sub group 13-1-1, and the control signals φCH1-2, φCH2-2, and φCH3-2 are input into the change-over switches 12-1-3 and 12-1-4 corresponding to the unit cell sub group 13-2-1.

As illustrated in FIG. 13, the unit 1002 includes the unit cell group 11-2, holding units CT5 to CT8, change-over switches 12-2-1 to 12-2-4, and the scanning circuit 6-2. Moreover, as illustrated in FIG. 14, the unit 1003 includes the unit cell group 11-3, holding units CT9 to CT12, change-over switches 12-3-1 to 12-3-4, and the scanning circuit 6-3.

The control signals φSW1-1, φSW 2-1, and φSW3-1 are input into the selecting switches 3-2-1 and 3-2-2, and 3-3-1, and 3-3-2 in the unit cell sub groups 13-1-2 and 13-1-3, respectively. Moreover, the control signals φSW1-2, φSW2-2, and φSW3-2 are input into the selecting switches 3-2-3 and 3-2-4, and 3-3-3 and 3-3-4 in the unit cell sub groups 13-2-2 and 13-2-3, respectively. The control signals φCH1-1, φCH2-1, and φCH3-1 are input into the change-over switches 12-2-1 and 12-2-2, and 12-3-1 and 12-3-2 corresponding to the unit cell sub groups 13-1-2 and 13-1-3, respectively, and the control signals φCH1-2, φCH2-2, and φCH3-2 are input into the change-over switches 12-2-3 and 12-2-4, and 12-3-3 and 12-3-4 corresponding to the unit cell sub groups 13-2-2 and 13-2-3, respectively.

Next, the operation of the present embodiment will be described with reference to the flow chart of FIGS. 11A and 11B and the timing chart of FIG. 12.

The same steps and timing as those illustrated in FIGS. 7 and 8 described above, respectively, are denoted by the same numbers as those in FIGS. 7 and 8, and their descriptions are omitted.

Figure 11B:
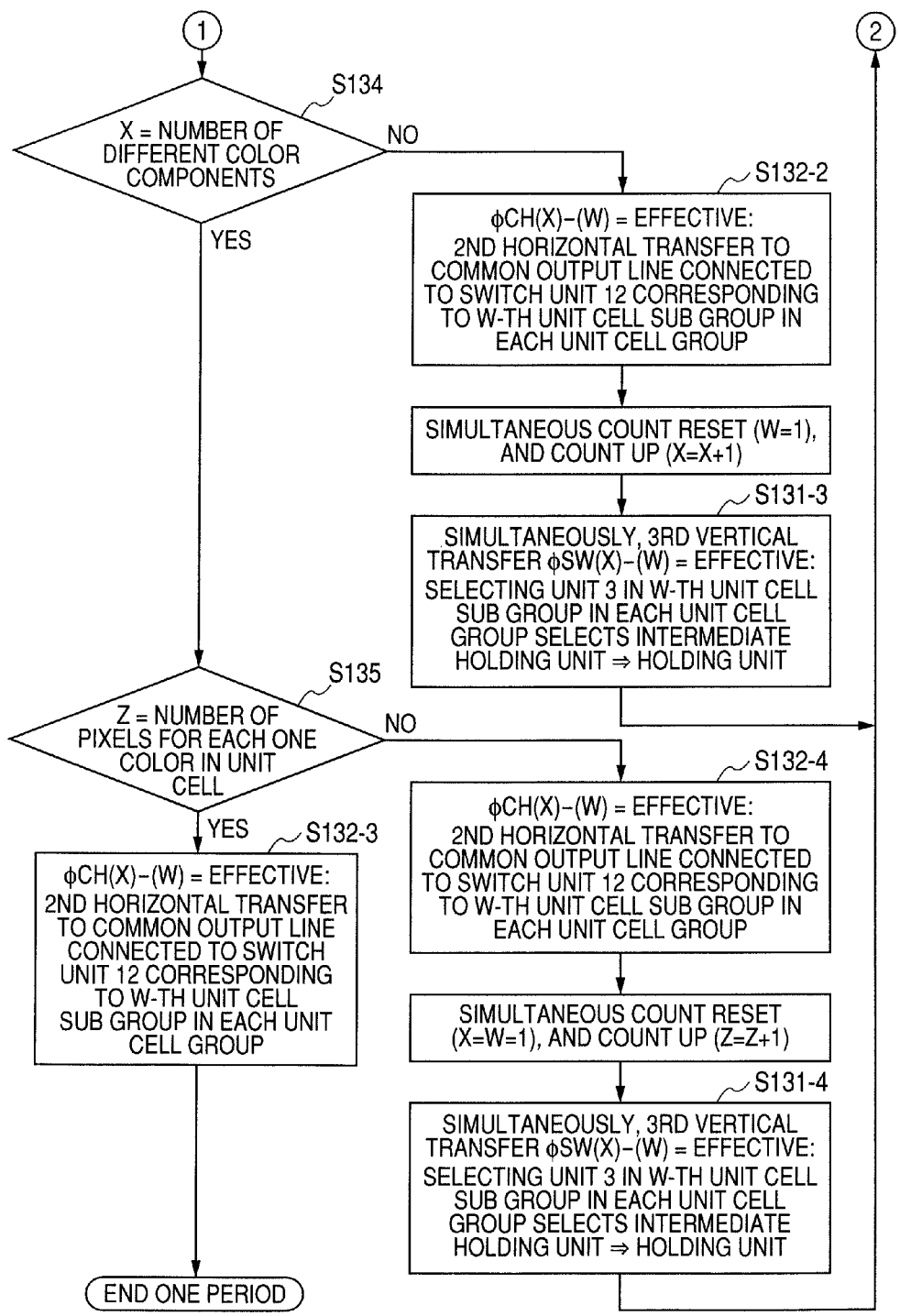
FIG. 11 is comprised of FIGS. 11A and 11B showing flow charts pertaining to the second embodiment of the present invention.

At Step S133 in FIGS. 11A and 11B, a third determination is executed. In the third determination, a variable W is supposed, and, after the variable W has changed in accordance with the flow chart of FIGS. 11A and 11B, it is determined whether the value of the variable W is the same (YES) as the number of the unit cell sub groups 13-1-1 to 13-2-3 (two in the present embodiment) in each of the unit cell groups 11-1 to 11-3 or not (NO) to determine the next operation. At Step S134, a fourth determination is executed. In the fourth determination, a variable X is supposed, and, after the variable X has changed in accordance with the flow chart of FIGS. 11A and 11B, it is determined whether the value of the variable X is the same (YES) as the number of color components R, G, and B (three colors in the present embodiment) or not (NO) to determine the next operation. At Step S135, a fifth determination is executed. In the fifth determination, a variable Z is supposed, and, after the variable Z has changed in accordance with the flow chart of FIGS. 11A and 11B, it is determined whether the variable Z is the same (YES) as the number of pixels (one in the present embodiment) of one color component in each of the unit cells 4-1-1 to 4-3-4 or not (NO) to determine the next operation.

The processing of the third determination at Step S133 can be realized by, for example, counting the number of times of third vertical transfers as the variable W with a third counter. The processing of the fourth and fifth determination at Steps S134 and S135 can be realized by counting the numbers of times of the answers YES of the third and fourth determine with fourth and fifth counters, respectively.

The control signals φSW1-1 and φCT-1 are changed to the High levels in a third vertical transfer period 131-1. Thereby, the signals held in the intermediate holding units CM1R and CM2R, CM5B and CM6B, and CM9G and CM10G selected by the selecting switches 3-1-1 and 3-1-2, 3-2-1 and 3-2-2, and 3-3-1 and 3-3-2, respectively, are written into the holding units CT1 and CT2, CT5 and CT6, and CT9 and CT10, respectively. The selecting switches 3-1-1 and 3-1-2, 3-2-1 and 3-2-2, and 3-3-1 and 3-3-2 are included in the unit cell sub groups 13-1-1, 13-1-2, and 13-1-3 in the unit cell groups 11-1 to 11-3, respectively.

Next, the control signals φSW1-2 and φCT-2 are changed to the High levels in a third vertical transfer period 131-2. Thereby, the signals held in the intermediate holding units CM3R and CM4R, CM7B and CM8B, CM11G and CM12G selected by the selecting switches 3-1-3 and 3-1-4, 3-2-3 and 3-2-4, and 3-3-3 and 3-3-4, respectively, are written into the holding units CT3 and CT4, CT7 and CT8, and CT11 and CT12, respectively. The selecting switches 3-1-3 and 3-1-4, 3-2-3 and 3-2-4, 3-3-3 and 3-3-4 are included in the unit cell sub groups 13-1-1, 13-1-2, and 13-1-3 in the unit cell groups 11-1 to 11-3, respectively.

Moreover, the control signal φCH1-1 is changed to the High level in a second horizontal transfer period 132-1 in parallel with the third vertical transfer period 131-2, and then scanning signals 7-1-1, 7-1-2, and 7-1-3 are output from the scanning circuits 6-1, 6-2, and 6-3, respectively. Then, the signals held in the holding units CT1, CT5, and CT9 connected to the unit cell sub groups 13-1-1, 13-1-2, and 13-1-3, respectively, are sequentially output in parallel to the common output lines 8-R, 8-B, and 8-G connected to the change-over switches 12-1-1, 12-2-1, and 12-3-1, respectively. Successively, scanning signals 7-2-1, 7-2-2, and 7-2-3 are output from the scanning circuits 6-1, 6-2, and 6-3, respectively. Then, the signals held in the holding units CT2, CT6, and CT10 connected to the unit cell sub groups 13-1-1, 13-1-2, 13-1-3, respectively, are sequentially output in parallel to the common output lines 8-R, 8-B, and 8-G connected to the change-over switches 12-1-2, 12-2-2, and 12-3-2, respectively.

Next, the control signal φCH1-2 is changed to the High level in a second horizontal transfer period 132-2, and thereby scanning signals 7-3-1, 7-3-2, and 7-3-3 are output from the scanning circuits 6-1, 6-2, and 6-3, respectively. Then, the signals held in the holding units CT3, CT7, and CT11 connected to the unit cell sub groups 13-2-1, 13-2-2, and 13-2-3, respectively, are sequentially output in parallel to the common output lines 8-R, 8-B, and 8-G connected to the change-over switches 12-1-3, 12-2-3, and 12-3-3, respectively. Successively, scanning signals 7-4-1, 7-4-2, and 7-4-3 are output from the scanning circuits 6-1, 6-2, and 6-3, respectively. Then, the signals held in the holding units CT4, CT8, and CT12 connected to the unit cell sub groups 13-2-1, 13-2-2, and 13-2-3, respectively, are sequentially output in parallel to the common output lines 8-R, 8-B, and 8-G connected to the change-over switches 12-1-4, 12-2-4, and 12-3-4, respectively.

In this manner, an R color signal, a B color signal, and a G color signal are output from the unit cell groups 11-1, 11-2, and 11-3 to the common output lines 8-R, 8-B, 8-G, respectively.

After that, a G color signal, an R color signal, and a B color signal are similarly output from the unit cell groups 11-1, 11-2, and 11-3 to the common output lines 8-G, 8-R, and 8-B, respectively, through the periods 131-3 and 131-4, and 132-3 and 132-4. Moreover, a B color signal, a G color signal, and an R color signal are similarly output from the unit cell groups 11-1, 11-2, and 11-3 to the common output lines 8-B, 8-G, and 8-R, respectively, through the periods 131-5 and 131-6, and 132-5 and 132-6.

In the following a description is given with reference to the flow chart of FIGS. 11A and 11B.

Because the processing from accumulation time to a first vertical transfer (Step S100) is the same as that of the first embodiment, the description thereof is omitted.

Next, the initial values of the third to fifth counters are set to one (X=Z=W=1) (Step S110).

The control signal φSW1-1 (φSW(X)-(W)=φSW1-1) is changed to the High level in the first third vertical transfer period 131-1. Thereby, in the first unit cell sub groups 13-1-1, 13-1-2, and 13-1-3 in the respective unit cell groups 11-1, 11-2, and 11-3, the selecting switches 3-1-1 and 3-1-2, 3-2-1 and 3-2-2, and 3-3-1 and 3-3-2 select the intermediate holding units CM1R and CM2R, CM5B and CM6B, and CM9G and CM10G, respectively, in the following relations, and the signal of each of the color components R, G, and B is written into the respective holding units CT1 and CT2, CT5 and CT6, and CT9 and CT10 (Step S131-1). The relations are:

51) unit cells 4-1-1 and 4-1-2 of unit cell sub group 13-1-1 ⇒ intermediate holding units CM1R and CM2R of R component;
52) unit cells 4-2-1 and 4-2-2 of unit cell sub group 13-1-2 ⇒ intermediate holding units CM5B and CM6B of B component; and
53) unit cells 4-3-1 and 4-3-2 of unit cell sub group 13-1-3 ⇒ intermediate holding units CM9G and CM10G of G component.

Next, as the third determination (Step S133) in a period 133-1, the answer is NO owing to the variable W=1, and the first second horizontal transfer (Step S132-1) in the period 132-1 is executed. At this time, the control signal φCH1-1 (φCH(X)-(W)=φCH1-1)) is changed to the High level. Thereby, in the first unit cell sub groups 13-1-1, 13-1-2, and 13-1-3 in the unit cell groups 11-1 to 11-3, respectively, the holding units CT1 and CT2, CT5 and CT6, and CT9 and CT10 are connected to the common output lines 8-R, 8-B, and 8-G, respectively, through the change-over switches 12 in the following relations:

61) holding units CT1 and CT2 ⇒ common output line 8-R of R component;
62) holding units CT5 and CT6 ⇒ common output line 8-B of B component; and
63) holding units CT9 and CT10 ⇒ common output line 8-G of G component.

The connection switching is completed at least before the first second horizontal transfer period 132-1. In the first second horizontal transfer period 132-1, the signals held in the holding units CT1 and CT2, CT5 and CT6, and CT9 and CT10 are sequentially output to the common output lines 8-R, 8-B, and 8-G, respectively, in response to the scanning of the scanning circuits 6-1, 6-2, and 6-3, respectively.

The third counter is counted up (W=W+1) before the completion of the first second horizontal transfer in the period 132-1 (that is, before the outputting of the second scanning signals at the second bits of the respective scanning circuits 6-1 to 6-3) (Step S132-1). The control signal φSW1-2 (φSW(X)-(W)=φSW1-2) is changed to the High level in the period 131-2 of the second vertical transfer processing. Thereby, in the second unit cell sub groups 13-2-1, 13-2-2, and 13-2-3 in the unit cell groups 11, the signals held in the intermediate holding units CM3R and CM4R, CM7B and CM8B, and CM11G and CM12G selected by the selecting switches 3-1-3 and 3-1-4, 3-2-3 and 3-2-4, and 3-3-3 and 3-3-4, respectively, are written into the holding units CT3 and CT4, CT7 and CT8, and CT11 and CT12, respectively, similarly to the first third vertical transfer.

Next, the processing returns to the third determination (Step S133) in the period 133-1, and the answer of the third determination becomes YES owing to the variable W=2. Because the number of times of the answers YES of the third determination is one, the answer of the fourth determination (Step S134) becomes NO owing to the variable X=1. Then, the control signal φCH1-2 (φCH(X)-(W)=φCH1-2) becomes the High level in the second horizontal transfer period 132-2, and the second horizontal transfer is executed (Step S132-2). Next the third counter is reset (W=2), and the fourth counter is counted up so that the variable X=X+1=2. After that, the control signal φCSW1-2 (φSW(X)-(W)=φSW2-1) becomes the High level in the third vertical transfer period 131-3, and the third vertical transfer is executed (Step S131-3). The processing then returns to the third determination (Step S133) in the period 133-1, and the answer of the third determination is NO owing to the variable W=1. Then, the aforesaid processing at Steps S132-1 to S131-2 is repeated. Then, when the variable W becomes two, the processing shifts to that at Step S134. Because the variable X=2, the answer of the determination at Step S134 becomes NO. Until the variable X becomes three, the operation mentioned above is repeated.

When the variable X becomes three, the processing moves to that at Step S135. Because the number of pixels of one color in each of the unit cells 4-1-1 to 4-3-4 is set to one in the present embodiment, the processing moves to that at Step S132-3, and the second horizontal transfer is executed. Then, the reading of the pixels for one period ends. If the number of pixels of one color in each of the unit cells 4-1-1 to 4-3-4 is two or more, then the processing at Steps S132-4 to S131-4 is executed.

Figure 12:
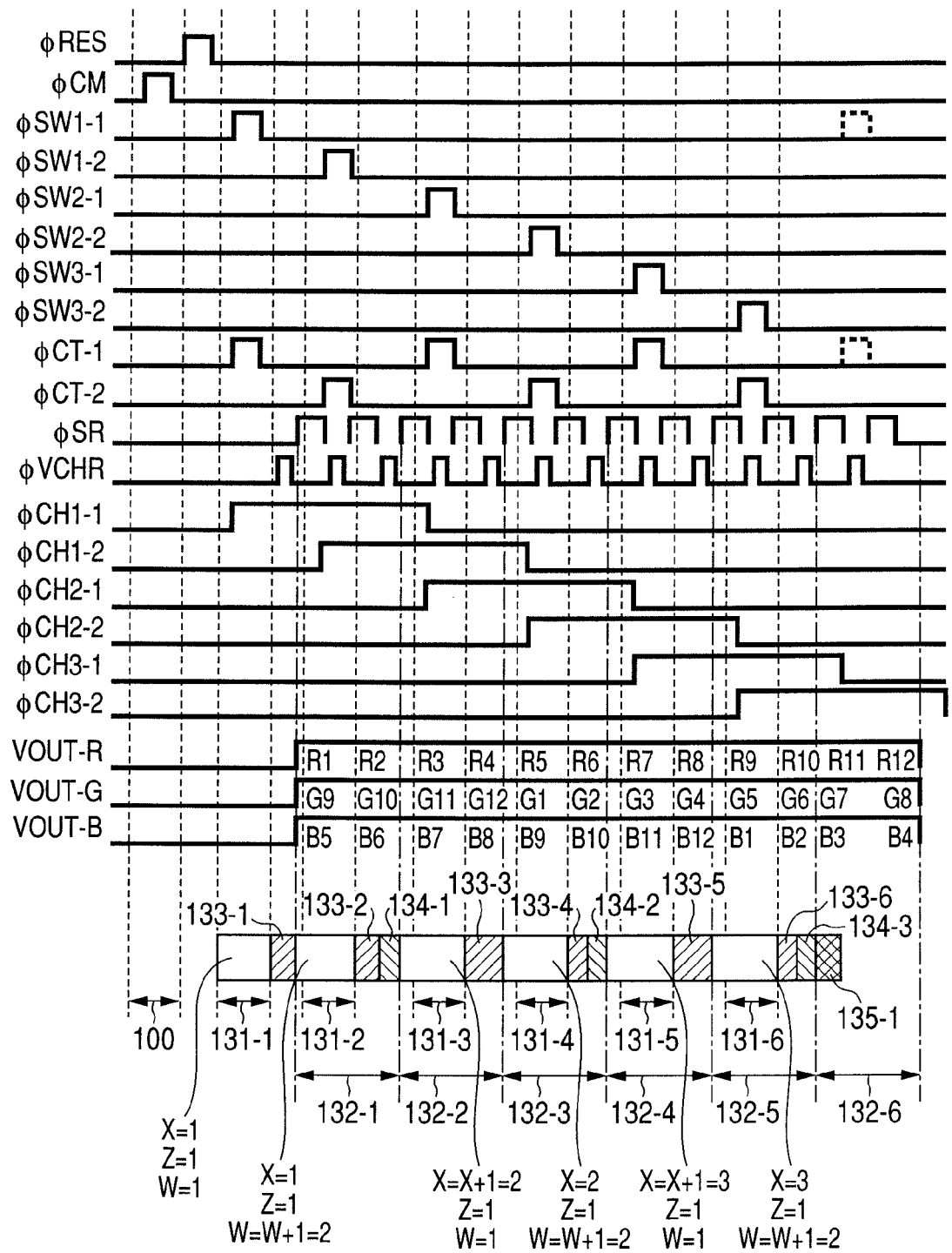
FIG. 12 is a timing chart pertaining to the second embodiment of the present invention.

The conclusive reading order is the one illustrated in FIG. 12 as VOUT-R, VOUT-G, and VOUT-B. In this manner, because the present embodiment performs the third vertical transfer operation simultaneously with the second horizontal transfer of pixel signals differently from the first embodiment, the pixel signals can be read without interrupting their reading, and as a result the operation of the reading of all the pixels 1-R, 1-G, and 1-B can be performed for the same time period as that of the conventional configuration. Moreover, it is also possible to generate dummy pulses by changing the control signals φCT1-1 and φSW1-1 to the High levels as illustrated by dotted lines in a sixth second horizontal transfer period 132-6 of FIG. 12, and to execute a pseudo third vertical transfer. Consequently, by making the generated pulse conditions uniform in the respective second horizontal transfer periods 132-1 to 132-6, the operations in all of the horizontal transfer periods 132-1 to 132-6 can be uniformed.

The control signal φRES for resetting the photoelectric conversion element 21 can be changed to the High level at arbitrary timing on and after the change of the control signal φCM to the High level here. However, also in order to take accumulation time as long as possible, it is desirable to perform the change of the control signal φRES during a period from the time just after the first vertical transfer to the time just before the first second horizontal transfer period 102-1.

Moreover, although the description of the present embodiment has been given to the case of using three colors of R, G, and B, the present invention may be configured by using an arbitrary number of colors of arbitrary color components. Moreover, the configuration of including a plurality of common output lines per color may be adopted. In this case, respective color outputs are led to be output in parallel.

Moreover, area sensors can be applied to the present embodiment similarly to the first embodiment.

As described above, in the second embodiment of the present invention, the solid-state imaging apparatus performing outputting every plurality of color components uses the intermediate holding units CM1R to CM12B and the selecting units, and each of the unit cells 4-1-1 to 4-3-4 includes one of the holding units CT1 to CT 12. Furthermore, all of the unit cells 4-1-1 to 4-3-4 are classified to the same number of unit cell groups 11-1 to 11-3 as the number of colors, and each of the unit cell groups 11-1 to 11-3 is classified into the plurality of unit cell sub groups 13-1-1 to 13-2-3. In each of the unit cell groups 11-1 to 11-3, the horizontal transfers and the vertical transfers are alternately and simultaneously performed by the unit cell sub groups 13-1-1 to 13-2-3 simultaneously. By the configurations described above, the solid-state imaging apparatus having a smaller area than that of the conventional configuration can be realized, keeping the signal reading time of the same degree as that of the conventional configuration. Furthermore, if the pseudo third vertical transfer operation is performed, the operations in all of the horizontal transfer periods 132-1 to 132-6 can be unformed by making the generated pulse conditions uniform.

(Third Embodiment)

An imaging system using the solid-state imaging apparatus described in the first and second embodiments will be described with reference to FIG. 15. On the basis of FIG. 15, an example of applying the solid-state imaging apparatus of the present invention to a camera will be described.

Figure 15:
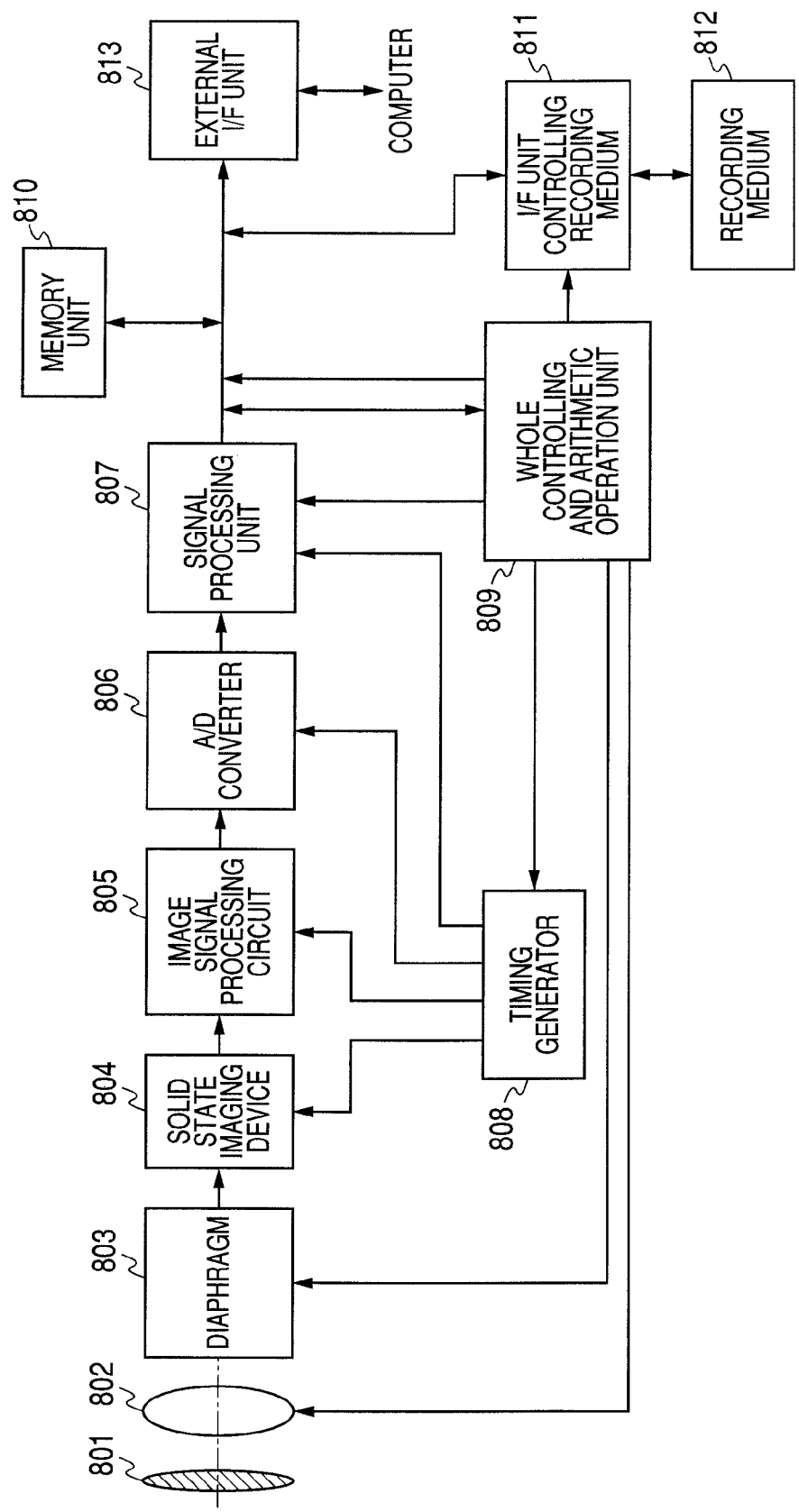
FIG. 15 is a block diagram illustrating an imaging system using a solid state imaging device according to the present invention.

In the configuration of FIG. 15, the camera includes a barrier 801 functions as both of a protector of a lens and a main switch, the lens 802 for forming an optical image of an object on a solid state imaging device 804, a diaphragm 803 for performing the change control of the quantity of the light passing through the lens 802, the solid state imaging device 804 for taking the optical image of the object formed by the lens 802 as an image signal, an image signal processing circuit 805 including a variable gain amplifier unit amplifying the image signal output from the solid state imaging device 804 and a gain correction circuit unit for correcting the gain value of the image signal, an A/D converter 806 performing the analogue to digital conversion of the image signal output from the solid state imaging device 804, a signal processing unit 807 performing various corrections and data compression of the image data output from the A/D converter 806, a timing generator 808 outputting various timing signals to the solid state imaging device 804, the image signal processing circuit 805, the A/D converter 806, and the signal processing unit 807, a whole controlling and arithmetic operation unit 809 controlling various operations and the whole still video camera, a memory unit 810 for storing image data temporarily, an interface unit controlling recording medium 811 for performing recording or reading against a recording medium 812, the recording medium 812 capable of being attached and detached to the main body of the still video camera, and an interface unit 813 for performing communication with an external computer and the like. The whole controlling and arithmetic operation unit 809 executes the processing on the basis of the flows illustrated in FIGS. 7 and 9. The recording medium 812 is a semiconductor memory or the like for performing the recording or reading of image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-285280, filed Nov. 1, 2007, which is hereby incorporated by reference herein in its entirety.

What is claimed is:

1. A solid-state imaging apparatus comprising:
   a plurality of unit cells each including a plurality of pixels having different color components and a first selecting unit for selecting and outputting signals from the plurality of pixels;
   a holding unit being provided correspondingly to each unit cell, and holding a signal outputted from the first selecting unit;
   a plurality of common output lines including first and second common output lines for outputting signals of the color components different from each other; and
   a second selecting unit, arranged on an electric path between the holding unit and the plurality of common output lines, for selecting the plurality of common output lines and for outputting the signal held by the holding unit to the common output line selected, wherein
   a predetermined number of the unit cells form a first unit cell group, and a predetermined number of the unit cells form a second unit cell group, and
   during a period of outputting, to the first common output line, a signal of a first color from one of the unit cells of the first unit cell group, a signal of a second color is outputted, to the second common output line, from one of the unit cells of the second unit cell group.

2. The solid-state imaging apparatus according to claim 1, wherein
the holding unit holding the signal outputted from the first selecting unit operates as a second holding unit, the unit cell includes further a plurality of first holding units for holding the signals outputted from the plurality of pixels, and the first selecting unit selects and outputs the signals held by the plurality of first holding units.

3. The solid-state imaging apparatus according to claim 1, wherein
the plurality of pixels are arranged along a column and along a direction different from a direction of the column.

4. The solid-state imaging apparatus according to claim 1, wherein
the different color components are respectively red, green and blue color components.

5. The solid-state imaging apparatus according to claim 1, wherein
the first selecting unit includes an amplifying unit for amplifying the signal to be outputted from the first selecting unit.

6. A camera comprising:
a solid-state imaging apparatus according to claim 1.

7. A copier comprising:
a solid-state imaging apparatus according to claim 1.

8. The solid-state imaging apparatus according to claim 1, wherein, during a period of outputting, to the first common output line, the signal of the first color continuously from a plurality of unit cells of the first unit cell group, the signal of the second color is outputted, to the second common output line, continuously from a plurality of unit cells of the second unit cell group.

9. A driving method of a solid-state imaging apparatus comprising:
a plurality of unit cells each including a plurality of pixels having different color components, a first holding unit for holding a signal outputted from the plurality of pixels and a first selecting unit for selecting and outputting the signals held by the first holding unit, wherein the plurality of unit cells are classified into a plurality of unit cell groups;
a second holding unit being provided correspondingly to each unit cell, and holding a signal outputted from the first selecting unit;
a plurality of common output lines to which the signals of different color components are outputted; and
a second selecting unit for selecting the plurality of common output lines and for outputting the signal held by the second holding unit to the common output line selected, wherein the signals selected by the first and second selecting units are in the different color components one group by one group of the unit cells, and wherein the method comprises:
(1) a first vertical transferring step for transferring a signal accumulated in the pixel to the first holding unit; and
(2) a processing step of each of the unit cell groups conducted sequentially one color by one color, wherein the processing step (2) comprises:
(a) a second vertical transfer step for selecting, by the first selecting unit, the first holding unit holding the signals of the different color components one group by one group of the unit cells, and for transferring the held signal to the second holding unit; and (b) a first horizontal transfer step for connecting, by the second selecting unit, the common output line corresponding to the signal of the color component held by the second holding unit connected to the second selecting unit with the second holding unit connected to the second selecting unit, and for outputting the signals held by the second holding units in unit cell groups sequentially one unit cell by one unit cell to the common output lines connected by the second selecting unit.

10. The driving method of a solid-state imaging apparatus according to claim 9, wherein
the plurality of pixels are arranged in a matrix, and wherein the unit cell includes the pixels in all rows of predetermined number of columns in the matrix, and the first holding units of a number equal to a number of the columns in the unit cell, such that each of the first holding units is connected to the pixels of each column.

11. A driving method of a solid-state imaging apparatus comprising:
a plurality of unit cells each including a plurality of pixels having different color components, a first holding unit for holding a signal outputted from the plurality of pixels and a first selecting unit for selecting and outputting the signals held by the first holding unit, wherein the plurality of unit cells are classified into a plurality of unit cell groups, and the plurality of unit cells within one unit cell group are classified into a plurality of unit cell subgroups;
a second holding unit being provided correspondingly to each unit cell, and holding a signal outputted from the first selecting unit;
a plurality of common output lines to which the signals of different color components are outputted; and
a second selecting unit for selecting the plurality of common output lines and for outputting the signal held by the second holding unit to the common output line selected, wherein the signals selected by the first and second selecting units are in the different color components one group by one group of the unit cells, and wherein the method comprises:
(1) a first vertical transferring step for transferring a signal accumulated in the pixel to the first holding unit; and
(2) a processing step of each of the unit cell groups conducted sequentially one color by one color and by one sub group by one sub group within one unit cell group, wherein the processing step (2) comprises:
(a) a second vertical transfer step for selecting, by the first selecting unit, the first holding unit holding the signals of the different color components one group by one group of the unit cells, and for transferring the held signal to the second holding unit; and
(b) a first horizontal transfer step for connecting, by the second selecting unit, the common output line corresponding to the signal of the color component held by the second holding unit connected to the second selecting unit with the second holding unit connected to the second selecting unit, and for outputting the signals held by the second holding units in unit cell groups sequentially one unit cell by one unit cell to the common output lines connected by the second selecting unit.

12. The driving method of a solid-state imaging apparatus according to claim 11, wherein,
in the (b) a first horizontal transfer step, during the transferring for the last unit cell, a dummy second vertical transfer step is conducted.

* * * * *